United States Patent [19]
Hanano et al.

[11] Patent Number: 5,661,603
[45] Date of Patent: Aug. 26, 1997

[54] IMAGE DISPLAY APPARATUS INCLUDING A FIRST AND SECOND PRISM ARRAY

[75] Inventors: Kazunari Hanano, Hachioji; Seiichiro Tabata, Hino; Yoichi Iba, Hachioji, all of Japan

[73] Assignee: Olympus Optical Co., Ltd., Tokyo, Japan

[21] Appl. No.: 523,505

[22] Filed: Sep. 1, 1995

[30] Foreign Application Priority Data

Sep. 5, 1994 [JP] Japan .................... 6-211068
Jun. 23, 1995 [JP] Japan .................... 7-157885

[51] Int. Cl.$^6$ .................... G02B 27/10; G02B 27/14; G02B 27/12
[52] U.S. Cl. .................... 359/622; 359/628; 359/630; 359/640
[58] Field of Search .................... 359/621, 622, 359/624, 625, 630, 631, 640, 741, 742, 566, 567; 353/38

[56] References Cited

U.S. PATENT DOCUMENTS 2,527,896 10/1950 Thirard .................... 359/640
5,371,556 12/1994 Suwa et al. .

FOREIGN PATENT DOCUMENTS 4170512 6/1992 Japan .
772422 3/1995 Japan .

Primary Examiner—George Y. Epps
Assistant Examiner—John P. Cornely
Attorney, Agent, or Firm—Cushman, Darby & Cushman IP Group of Pillsbury Madison & Sutro LLP

[57] ABSTRACT

An image display apparatus, e.g., a head-mounted image display apparatus, which uses a compact optical system and yet has minimal aberrations and a large exit pupil diameter. An image displayed on a liquid crystal display device (2) is projected as an enlarged image in a user's eyeball by a convex lens (3). Prism arrays (13 and 14) having the same vertex angle are disposed in parallel to each other between the convex lens (3) and an exit pupil (6) so that the array directions coincide with each other. A parallel beam of light passed through the convex lens (3) has a pupil diameter (a) determined by the numerical aperture of an illumination system (1). The parallel beam first enters the prism array (13) and separates into light beams traveling in four different directions by the prism refracting action. These light beams then enter the prism array (14), which has the same vertex angle as that of the prism array (13). Consequently, the light beams are refracted again to become parallel to each other. As a result, the beam diameter (a) of the light before entering the prism array (13) enlarges to a beam diameter (b) after the light has emanated from the prism array (14). Accordingly, the effective pupil diameter enlarges.

22 Claims, 28 Drawing Sheets

Total reflection $\theta_{in} = \theta_{out}$ $\theta in \neq \theta out$

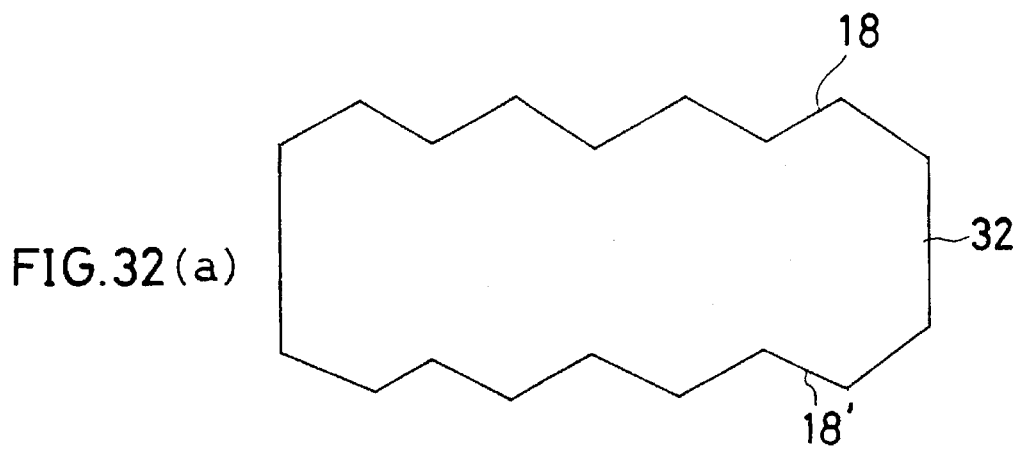
FIG. 32(a)
FIG. 32(b)
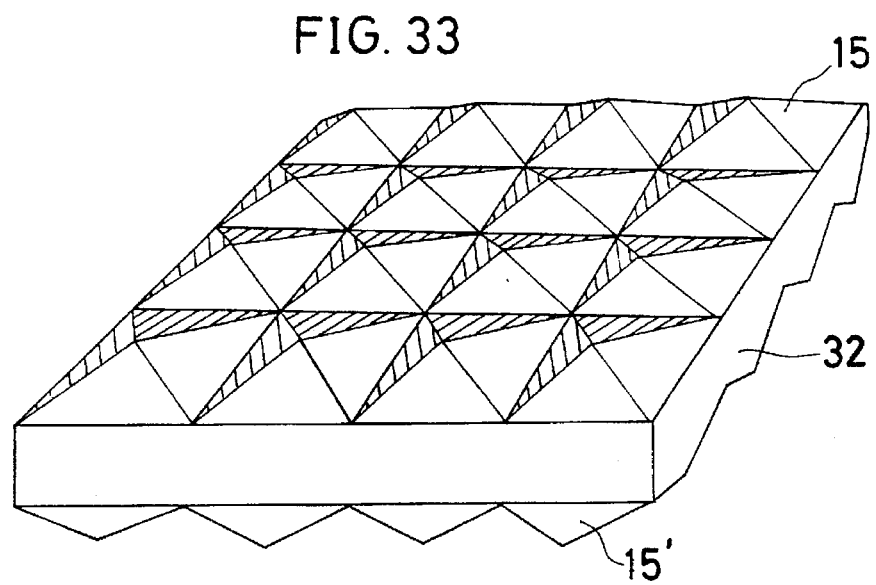
FIG. 33

FIG.46(a)
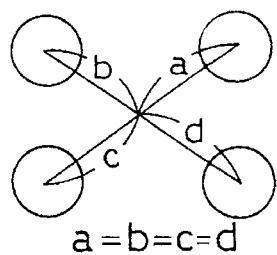
$a=b=c=d$
FIG.46(b)
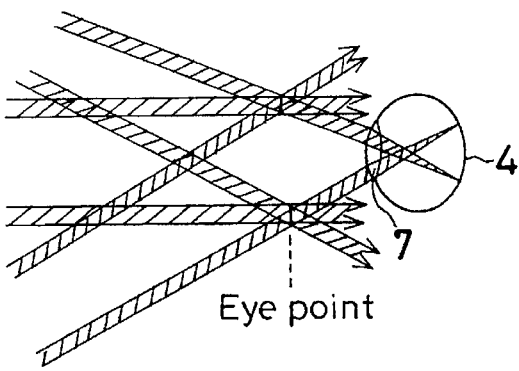
Eye point
FIG.47(a)
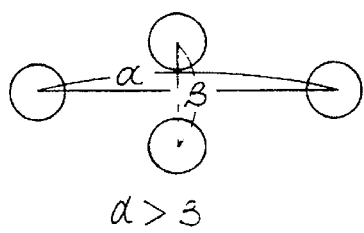
$\alpha > \beta$
FIG.47(b)
FIG.47(c)
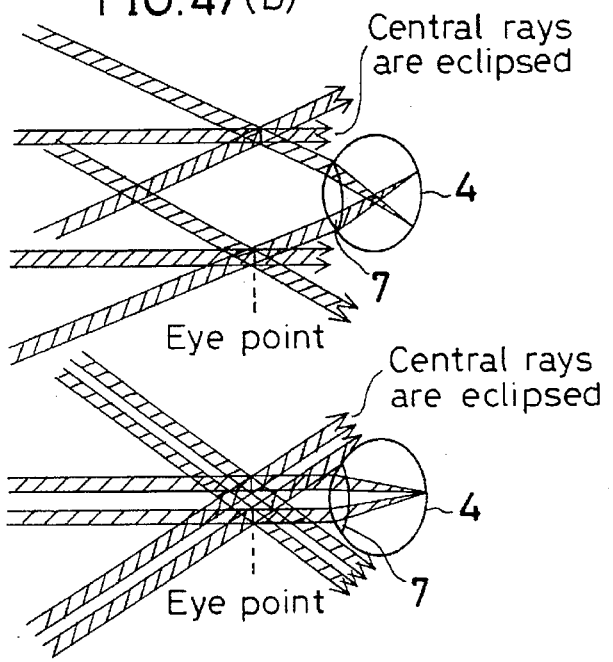
Central rays are eclipsed
Eye point
Central rays are eclipsed
Eye point
FIG.48(a)
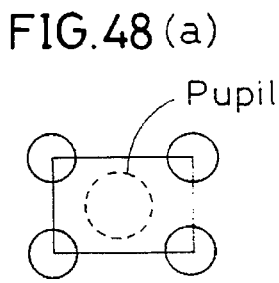
Pupil
FIG.48(b)
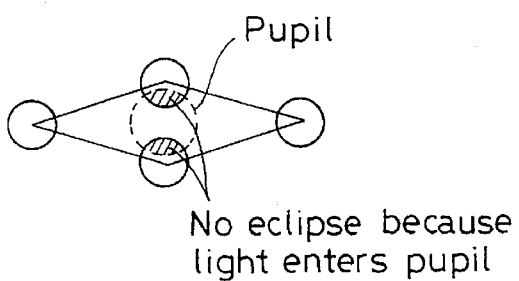
Pupil
No eclipse because light enters pupil $D_1 \neq D_2$ p q r s

IMAGE DISPLAY APPARATUS INCLUDING A FIRST AND SECOND PRISM ARRAY

BACKGROUND OF THE INVENTION

1. Field of the Invention

The present invention relates to an image display apparatus and, more particularly, to an image display apparatus, for example, a head-mounted image display apparatus, which uses a compact optical system and yet has a large exit pupil diameter.

2. Background of Related Art

Helmet- and goggle-type head-mounted image display apparatuses have heretofore been developed for the purpose of enabling the user to enjoy virtual reality or wide-screen images personally.

Conventional head-mounted image display apparatuses are generally arranged such that an image displayed on a two-dimensional display device, e.g., a liquid crystal display device, is projected on the user's retina as an enlarged image by using an ocular optical system (e.g., Japanese Patent Application Laid-Open (KOKAI) No. 4-170512). However, if the ocular optical system has a large numerical aperture, aberrations are likely to occur, and it is necessary in order to prevent occurrence of aberrations to use a complicated arrangement and a large-sized lens. To solve this problem, a head-mounted image display apparatus in which the numerical aperture is limited at the illumination system side has been proposed (Japanese Patent Application Laid-Open (KOKAI) No. 3-214872) of which U.S. Pat. No. 5,371,556 is a family member.

However, when the numerical aperture of the ocular lens is small, it is likely that light rays will be eclipsed by the pupil of the user's eye. This problem will be explained below with reference to FIGS. 54(a) and 54(b) in the accompanying drawings. FIG. 54(a) shows an essential part of a conventional head-mounted image display apparatus. An illumination system 1 illuminates a liquid crystal display device 2 from behind it, thereby allowing an image displayed on the liquid crystal display device 2 to be projected on the retina 5 of a user's eyeball 4 as an enlarged image by a convex lens 3 constituting an ocular optical system. To minimize aberrations produced by the convex lens 3, the illumination system 1 illuminates the liquid crystal display device 2 with a small numerical aperture. Accordingly, the diameter of the exit pupil 6 of this head-mounted image display apparatus is small, as shown in FIG. 54(a). If the user wears the head-mounted image display apparatus such that the exit pupil 6 is precisely coincident with the position of the user's pupil 7, light rays emanating from central and peripheral images $P_1$ and $P_2$ on the liquid crystal display device 2 pass through the pupil 7, as shown in FIG. 54(a), as long as the user gazes at the center of the displayed image. Therefore, the user can observe the whole image displayed on the liquid crystal display device 2, from the center to the periphery of the displayed image. It should be noted that reference symbols $P_1'$ and $P_2'$ denote the images $P_1$ and $P_2$ projected on the retina 5.

However, when the exit pupil 6 and the position of the user's pupil 7 are not precisely coincident with each other, the light rays are eclipsed by the pupil 7, resulting in a darkened image. When the user looks at the peripheral image $P_2'$, as shown in FIG. 54(b), the eyeball 4 rotates about the point of rolling, which lies in the vicinity of the center of the eyeball 4. Therefore, the position of the pupil 7 shifts, and it becomes even more difficult for the light rays emanating from the central and peripheral images $P_1$ and $P_2$ to pass through the pupil 7. In an extreme case, it becomes impossible to observe the displayed image.

As a method of solving the above-described problems, there is a method in which, as shown in FIG. 55, the pupil diameter is enlarged by disposing two diffraction gratings 11 and 12 in parallel to each other (Japanese Patent Application No. 6-41166). In the head-mounted image display apparatus, shown in FIG. 55, an image displayed on a liquid crystal display device 2 is projected in a user's eyeball as an enlarged image by a convex lens 3 constituting an ocular optical system. The liquid crystal display device 2 is illuminated by an illumination system 1 disposed behind it to project the image displayed thereon. In the conventional apparatus, a pair of diffraction gratings 11 and 12, which have the same grating interval, are disposed in parallel to each other between the convex lens 3 of the ocular optical system and the exit pupil 6 thereof such that the grating directions of the diffraction gratings 11 and 12 coincide with each other. By virtue of the above-described arrangement of the pair of diffraction gratings 11 and 12, a parallel beam of light passed through the convex lens 3 first enters the diffraction grating 11 and separates into zeroth-order diffracted light, +1st-order diffracted light, and −1st-order diffracted light. These diffracted beams of light then enter the diffraction grating 12, which has the same grating interval as that of the diffraction grating 11. Thus, these beams of light are diffracted again, and a part of the light becomes a parallel beam. As a result, the beam diameter a of the light before entering the diffraction grating 11 enlarges to a beam diameter b after the light has emanated from the diffraction grating 12. Thus, the effective pupil diameter enlarges.

Since the above-described conventional method makes it possible to enlarge the pupil diameter in between the ocular optical system and the user's eye, the ocular optical system can be reduced in size. However, the diffraction angle of the diffraction gratings 11 and 12 depends largely on the wavelength, and large chromatic aberration occurs at the position of the exit pupil 6. Consequently, as the eye is moved, the projected image undesirably looks changeable in color.

SUMMARY OF THE INVENTION

In view of the above-described problems of the conventional technique, it is an object of the present invention to provide an image display apparatus, e.g., a head-mounted image display apparatus, which uses a compact optical system and yet has minimal aberrations and a large exit pupil diameter.

To attain the above-described object, the present invention provides an image display apparatus having a device for displaying an image, and an ocular optical system for forming an exit pupil by using a bundle of light rays emanating from the image display device. The image display apparatus includes a first prism array provided between the image display device and the exit pupil to separate a bundle of light rays emanating from the image display device, and a second prism array which directs at least a part of the ray bundle separated by the first prism array to travel in the same direction.

In addition, the present invention provides an image display apparatus having a device for displaying an image, an ocular optical system for forming an exit pupil by using a bundle of light rays emanating from the image display device, and a support device for retaining the image display device and the ocular optical system on the observer's head.

The image display apparatus includes a first prism array which is provided between the image display device and the exit pupil to separate a bundle of light rays emanating from the image display device, and a second prism array which directs at least a part of the ray bundle separated by the first prism array to travel in the same direction.

In the above-described image display apparatuses of the present invention, each of the first and second prism arrays may comprise quadrangular pyramids which are regularly arranged in a two-dimensional array on a surface of a transparent substrate. Further, each of the first and second prism arrays may be formed by superimposing a plurality of one-dimensional prism array surfaces which are different in period direction from each other.

In the present invention, the image display apparatus has a first prism array which is provided between the image display device and the exit pupil to separate a bundle of light rays emanating from the image display device, and a second prism array which directs at least a part of the ray bundle separated by the first prism array to travel in the same direction. Accordingly, at least a part of the ray bundle separated by the first prism array is directed by the second prism array to travel in the same direction. Consequently, the diameter of the ray bundle enlarges, and thus the exit pupil diameter enlarges. Accordingly, it is possible to obtain an image display apparatus which uses a compact optical system and yet has minimal aberrations.

It should be noted that in a case where each of the first and second prism arrays is formed from quadrangular pyramids which are regularly arranged in a two-dimensional array on a surface of a transparent substrate, four light beams can be formed to enlarge the exit pupil diameter. Accordingly, an exit pupil having a large diameter necessary for a wide-field angle optical system can be efficiently formed.

In a case where each of the first and second prism arrays is formed by superimposing a plurality of one-dimensional prism array surfaces which are different in period direction from each other, it is easy to produce prism arrays used to form four light beams for enlarging the exit pupil diameter.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention with be indicated in the claims.

BRIEF DESCRIPTION OF THE DRAWINGS

FIGS. 32(a) and 32(b) are sectional and perspective views of a prism array in an eleventh embodiment of the present invention.

FIG. 33 is a perspective view showing a modification of the prism array in the eleventh embodiment.

FIGS. 46(a) and 46(b) illustrate a pupil arrangement similar to that shown in FIG. 8 except that the diameter of each separated exit pupil is reduced, and the distance between the separated exit pupils is lengthened.

FIGS. 47(a), 47(b) and 47(c) illustrate a pupil arrangement in a nineteenth embodiment of the present invention.

FIGS. 48(a) and 48(b) comparatively illustrate the pupil arrangements shown in FIGS. 46(a) and 47(a).

DESCRIPTION OF THE PREFERRED EMBODIMENTS

The image display apparatus of the present invention will be described below by way of some embodiments and with reference to the accompanying drawings.

Figure 1:
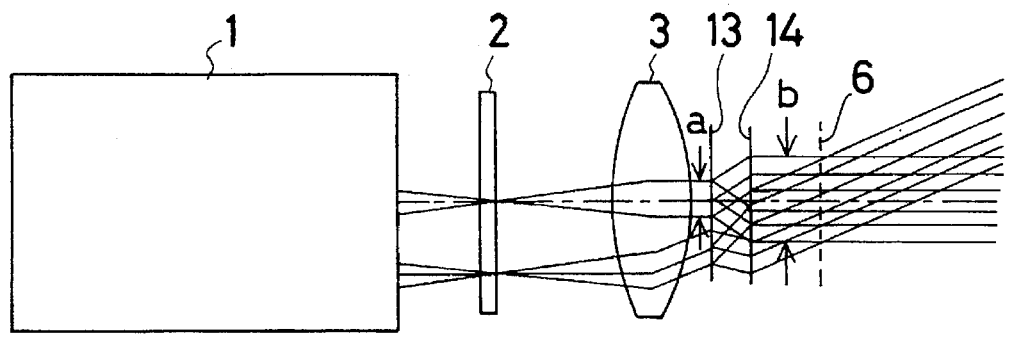
FIG. 1 shows an essential part of a head-mounted image display apparatus according to a first embodiment of the present invention.

First Embodiment:

FIG. 1 shows an essential part of a head-mounted image display apparatus according to a first embodiment of the present invention. In this image display apparatus, an image displayed on a liquid crystal display device 2 is projected in a user's eyeball as an enlarged image by a convex lens 3 constituting an ocular optical system. The liquid crystal display device 2 is illuminated by a numerical aperture-limited illumination system 1 which is disposed behind it to project the image displayed thereon. According to the present invention, a pair of prism arrays 13 and 14, which have the same vertex angle, are disposed in parallel to each other between the convex lens 3 of the ocular optical system and the exit pupil 6 thereof such that the array directions of the prism arrays 13 and 14 coincide with each other.

By virtue of the above-described arrangement of the pair of prism arrays 13 and 14, a parallel beam of light passed through the convex lens 3 has a pupil diameter a which is determined by the numerical aperture of the illumination system 1. The parallel beam first enters the prism array 13 and separates into light beams traveling in four different directions by the prism refracting action. These light beams then enter the prism array 14, which has the same vertex angle as that of the prism array 13. Consequently, the light beams are refracted again to become parallel to each other. As a result, the beam diameter a of the light before entering the prism array 13 increases to a beam diameter b after the light has emanated from the prism array 14. Accordingly, the effective pupil diameter enlarges.

Figure 2A:
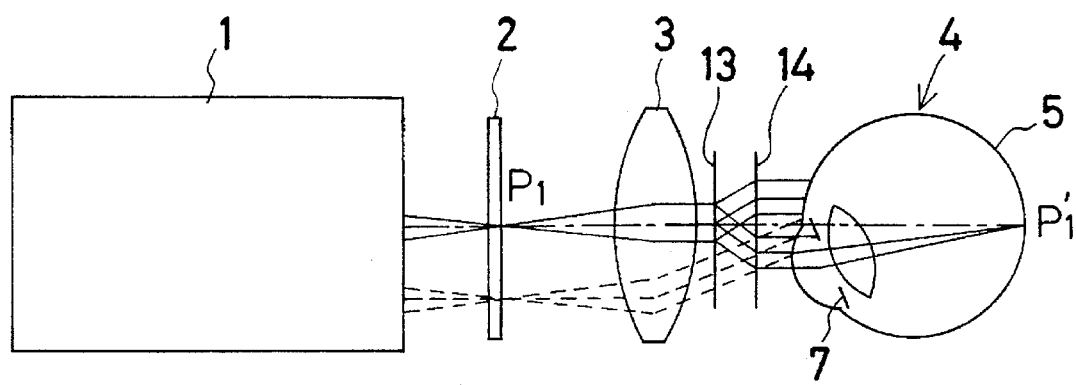
FIGS. 2(a) and 2(b) illustrate the function of the embodiment shown in FIG. 1.
Figure 2B:
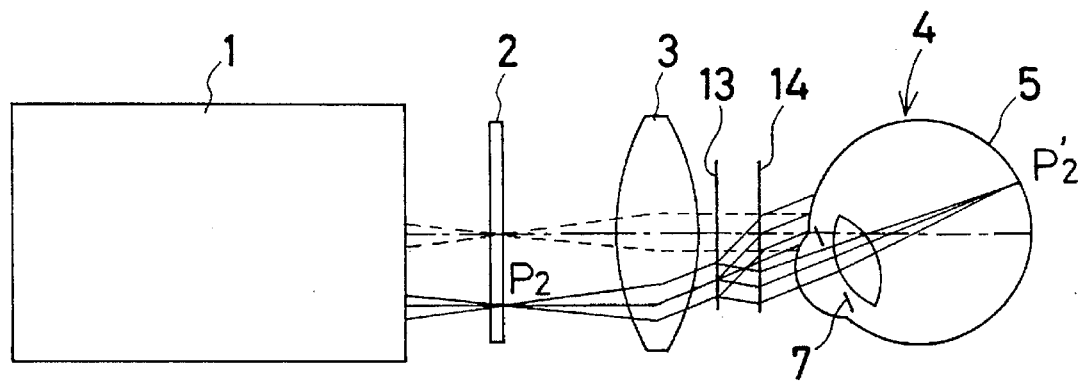

Since the pupil diameter is enlarged as described above, even if the user shifts the position of his/her pupil 7 so that his/her line of slight is directed to the peripheral image P$_2$', as shown in FIGS. 2(a) and 2(b), light rays emanating from the central and peripheral images P$_1$ and P$_2$ pass through the pupil 7 of the eyeball 4. Thus, the light rays from the central and peripheral images P$_1$ and P$_2$ are taken into the eyeball 4, and central and peripheral images P$_1$' and P$_2$' are formed on the retina 5.

Figure 3A:
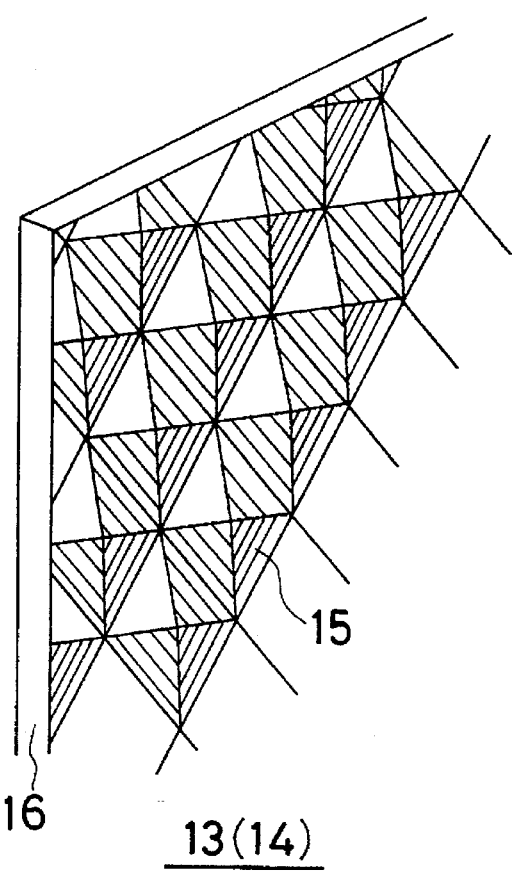
FIGS. 3(a) and 3(b) are perspective and sectional views of one example of a prism array.
Figure 3B:
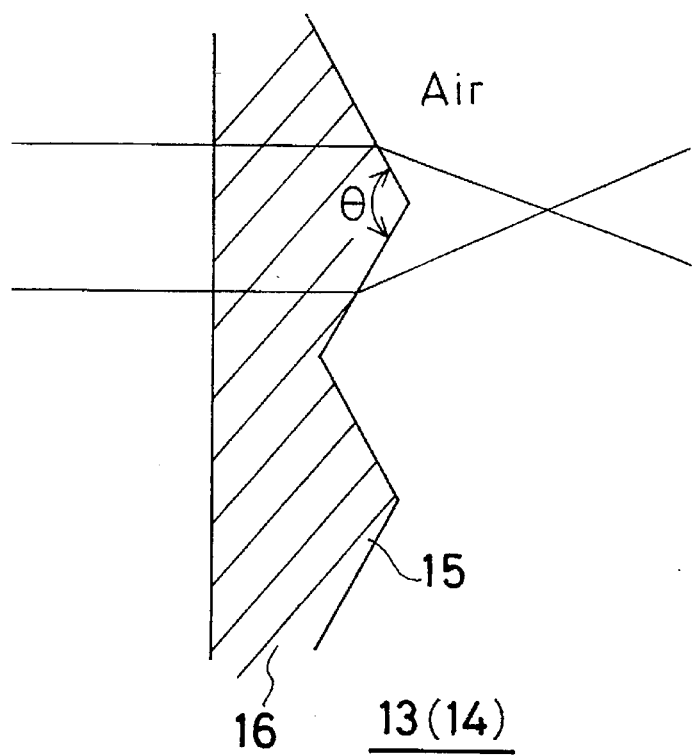
Figure 4:
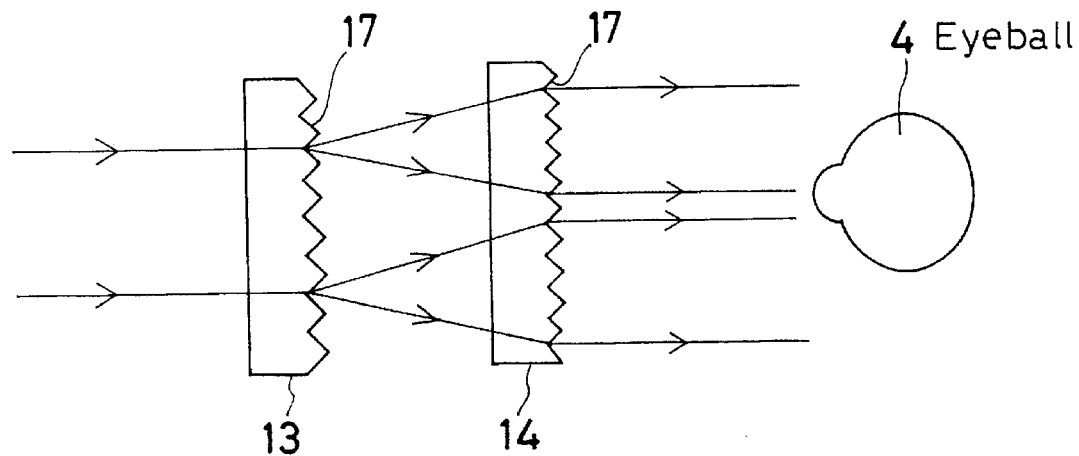
FIG. 4 shows the way in which the pupil diameter is enlarged by a pair of prism arrays.

The principle based upon which the pupil diameter is enlarged by the pair of prism arrays 13 and 14 will be explained below. FIG. 3(a) is a perspective view showing a prism array usable as the prism arrays 13 and 14, in which quadrangular pyramids 15 are regularly arranged on a surface of a transparent substrate 16. As shown in FIG. 3(b), the prism array has a sectional configuration which is defined by repetition of V-shapes with a vertex angle 8. When light enters the first prism array 13 of the pair of prism arrays 13 and 14, as shown in FIG. 4, the incident light is refracted by the V-shaped slant surfaces of the quadrangular pyramids 15. Consequently, the incident light separates into two light beams traveling in two different directions (four different directions in total) in the cross-section shown in FIG. 3(b). These light beams are refracted again by the second prism array 14 so as to travel parallel to each other in the same direction as that of the incident light. Since light beams which once separate in different directions and then travel parallel to each other form an exit pupil, the diameter of the entire light beam enlarges, and thus the pupil diameter enlarges.

Figure 5A:
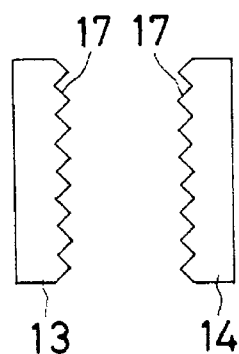
FIGS. 5(a), 5(b) and 5(c) show modifications of the prism array arrangement.
Figure 5B:
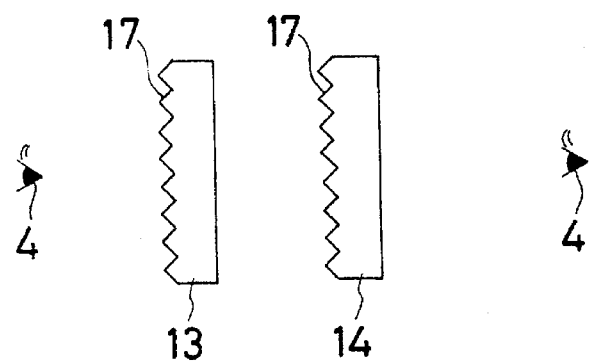
Figure 5C:
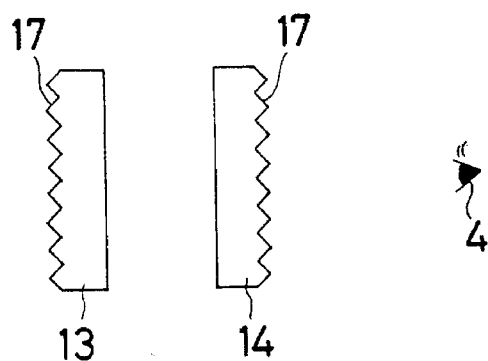

In FIG. 4, the pair of prism arrays 13 and 14 are disposed so that the prism array surfaces 17 of both the prism arrays 13 and 14 face the eye 4. However, the prism arrays 13 and 14 may be disposed in other forms as shown in FIGS. 5(a) to 5(c). In FIG. 5(a), the prism array surfaces 17 face each other; in FIG. 5(b), both the prism array surfaces 17 face in an direction opposite from the eye 4; and in FIG. 5(c), the prism array surfaces 17 face away from each other in opposite directions.

Figure 6A:
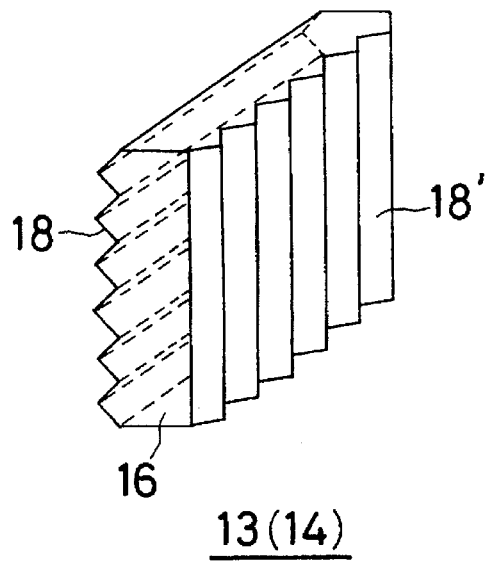
FIGS. 6(a) and 6(b) are perspective views showing other examples of prism arrays.
Figure 6B:
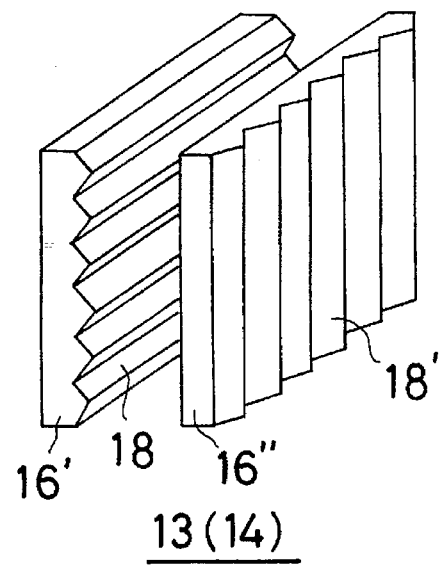

Further, the arrangement of each of the prism arrays 13 and 14, in which quadrangular pyramids 15 are regularly disposed on a surface of a transparent substrate 16 (FIG. 3(a)), may be replaced by an arrangement shown in FIG. 6(a), in which obverse and reverse sides of a transparent substrate 16 are provided with trough roof-shaped prism array surfaces 18 and 18' having periods in different directions (at 90° in the illustrated example). Light incident on the prism array 13 (14) separates into two light beams at the obverse prism surface 18, and each light beam separates into two light beams at the reverse prism surface 18'. Therefore, the prism array surfaces 18 and 18' act in the same way as the quadrangular pyramids 15. The arrangement of the prism arrays 13 and 14 may also be such that, as shown in FIG. 6(b), trough roof-shaped prism array surfaces 18 and 18' having periods in different directions (at 90° in the illustrated example) are provided on two discrete substrates 16' and 16". The use of such one-dimensional prism array surfaces 18 and 18' makes it easier to produce the prism arrays 13 and 14.

Figure 7:
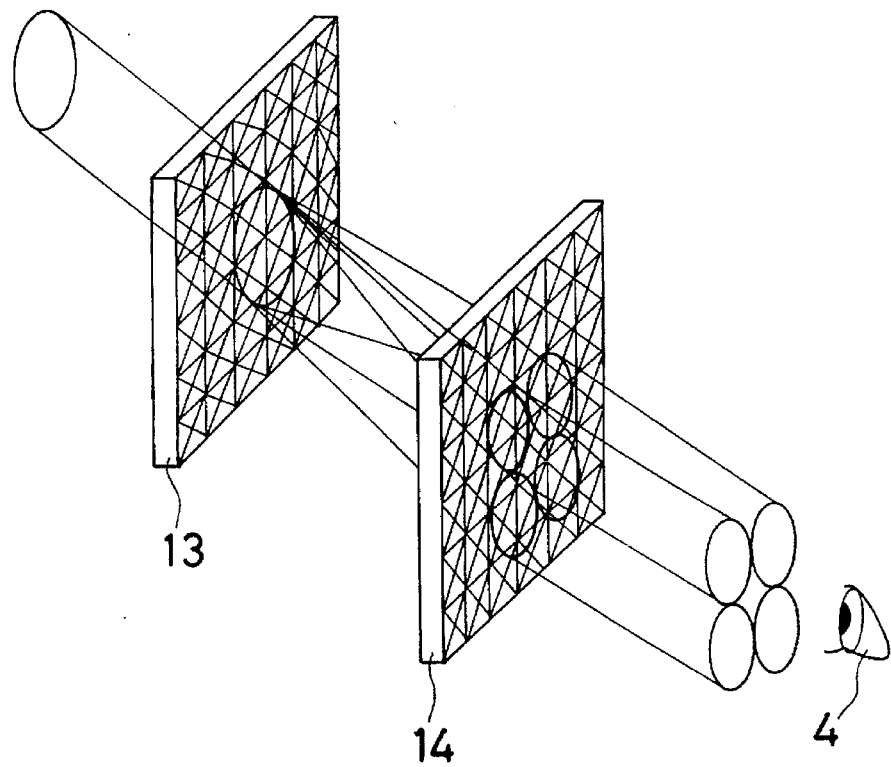
FIG. 7 shows the way in which light beams form an exit pupil in the first embodiment.
Figure 8:
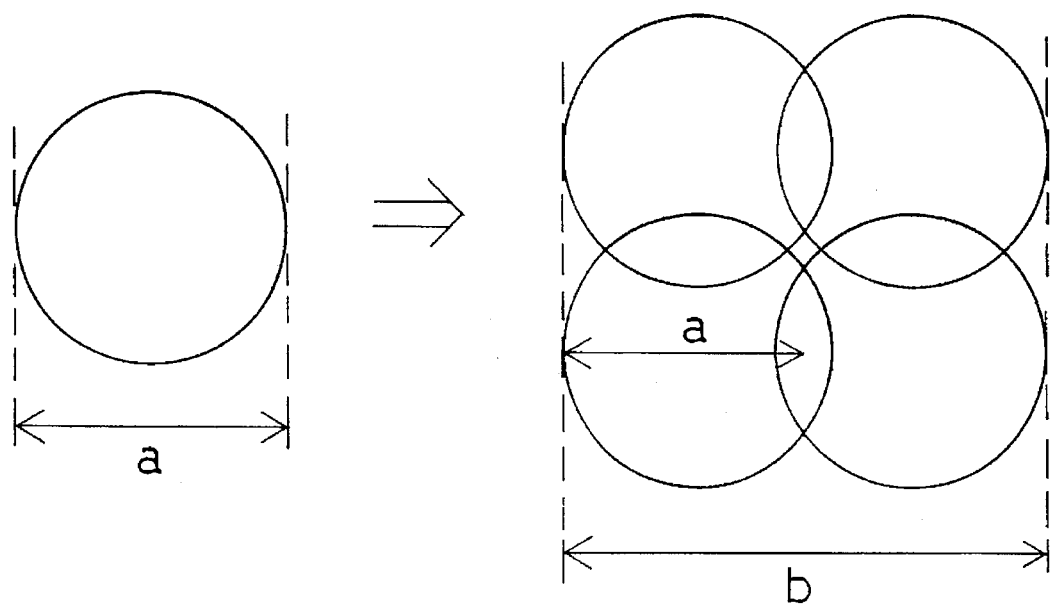
FIG. 8 shows the way in which the pupil diameter is enlarged in the first embodiment.

The prism arrays 13 and 14, which are provided with the quadrangular pyramids 15 or the trough roof-shaped prism array surfaces 18 and 18' having periods in different directions, are disposed between the convex lens 3 of the ocular optical system and the exit pupil 6 thereof. Consequently, incident light separates into two beams in each of vertical and horizontal directions. Therefore, as shown in FIG. 7, a total of four light beams overlap each other to produce a large exit pupil. That is, as shown in FIG. 8, four light beams each having a beam diameter a before the light enters the prism array 13 are allowed to overlap each other, thereby obtaining an enlarged pupil diameter b. For example, the pupil diameter a=4 mm before the prism array 13 can be enlarged to a pupil diameter b=7 mm. If the pupil diameter is as large as 7 mm, an enlarged image having a field angle of 45° can be observed as far as the periphery thereof without eclipse even if the user tilts his/her eyeball 4 to look at a peripheral portion of the enlarged image.

Figure 9:
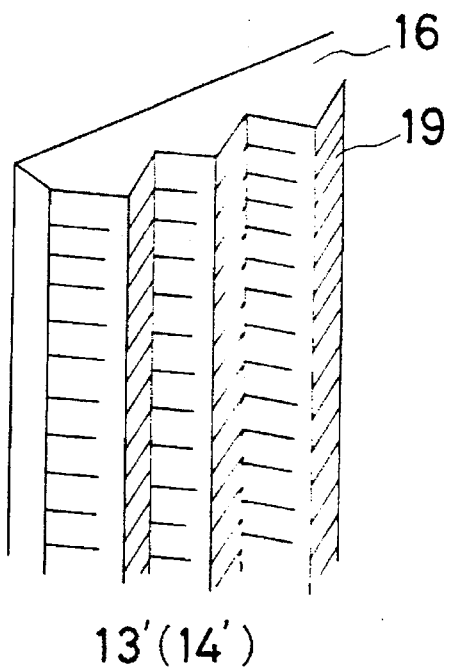
FIG. 9 is a perspective view showing a prism array in a second embodiment of the present invention.
Figure 10:
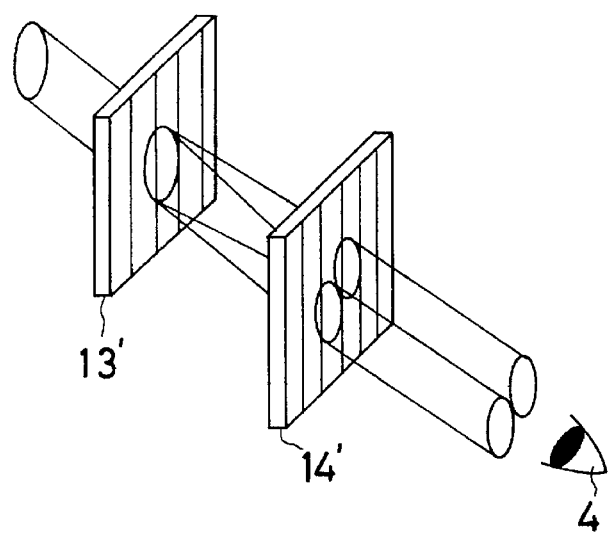
FIG. 10 shows the way in which light beams form an exit pupil in the second embodiment.
Figure 11:
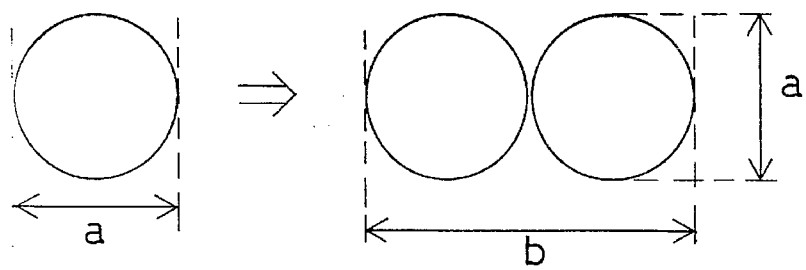
FIG. 11 shows the way in which the pupil diameter is enlarged in the second embodiment.

Second Embodiment:

As shown in FIG. 9, the prism arrays 13 and 14 in the first embodiment may be replaced by prism arrays 13' and 14' each having a trough roof-shaped prism array surface 19 provided on a transparent substrate 16. The prism array surface 19 is defined by V-shaped troughs which are provided periodically in a one-dimensional direction. In this case, as shown in FIG. 10, an incident light beam is separated into two light beams, and thus the pupil diameter is enlarged. For example, as shown in FIG. 11, an exit pupil having a diameter a=4 mm before the prism array 13' can be enlarged to an exit pupil which is 8 mm (b) in the horizontal direction and 4 mm (a) in the vertical direction. With this exit pupil, an enlarged image having a field angle of 30° can be observed as far as the periphery thereof without eclipse even if the user tilts his/her eyeball 4 to look at a peripheral portion of the enlarged image.

Figure 12:
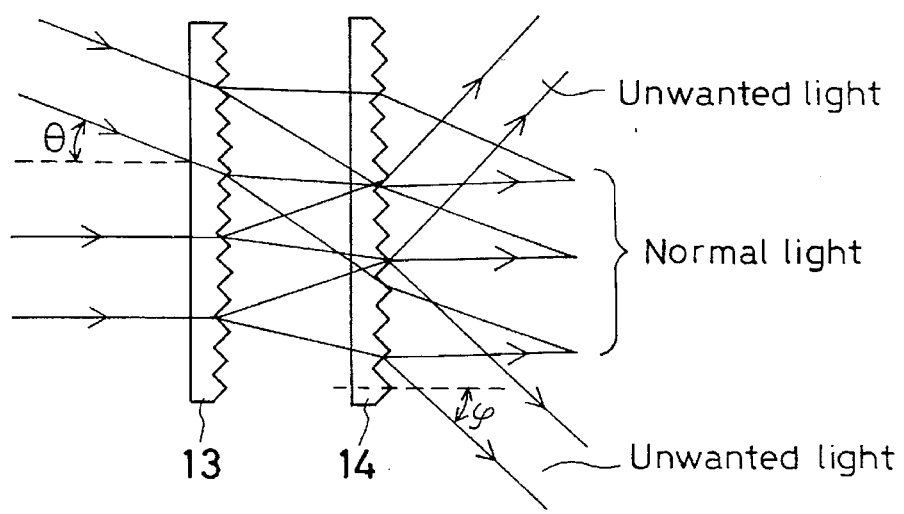
FIG. 12 shows the way in which unwanted light occurs to form a ghost image.
Figure 13:
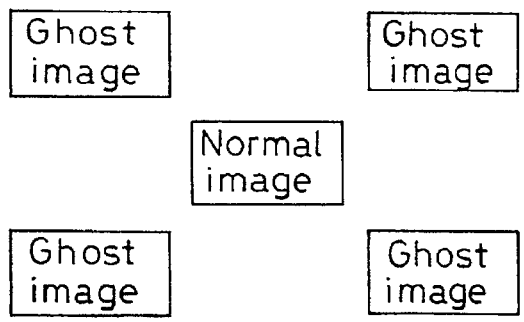
FIG. 13 shows the way in which ghost images are formed around a normal image.
Figure 14:
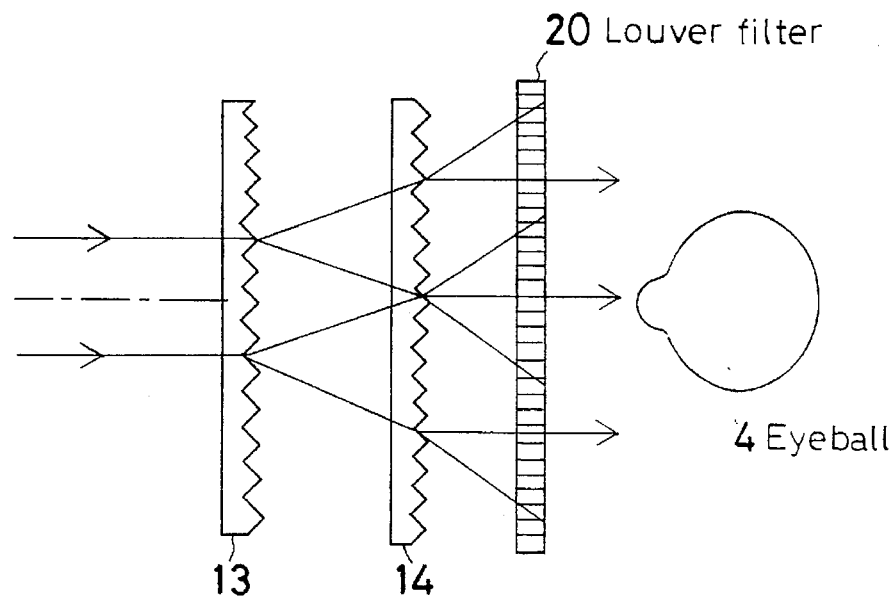
FIG. 14 shows the way in which unwanted light is cut off in a third embodiment of the present invention.
Figure 15:
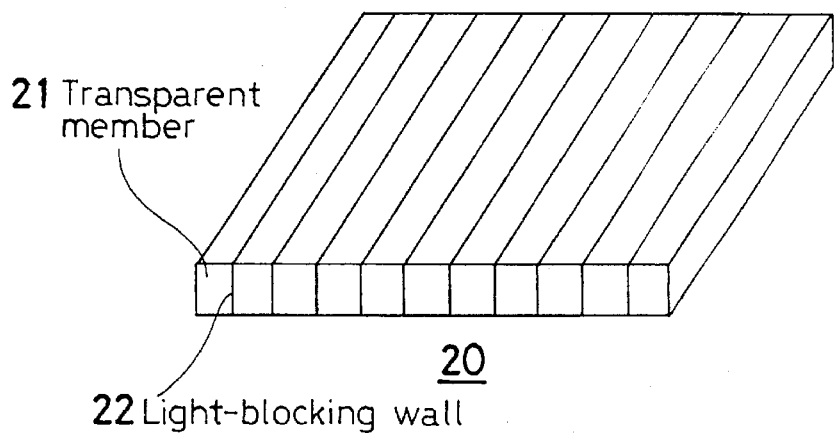
FIG. 15 is a perspective view showing the arrangement of a louver filter.

Third Embodiment:

In this embodiment, measures are taken to eliminate unwanted light which is produced by the prism arrays 13 and 14 (13' and 14'). As shown in FIG. 12, light that enters the prism array 13 (13') separates into two or four light beams, which then enter the prism array 14 (14') where each light beam further separates into two or four light beams. Among the light beams, those which emerge from the prism array 14 at the same angle as the previous incident angle (i.e. normal light) form a normal image, as shown in FIG. 13. However, the other light beams are unwanted light (ghost light) which forms ghost images, as shown in FIG. 13. Therefore, measures must be taken to prevent the ghost images from overlapping the normal image. In order to avoid overlap of the ghost images, the exit angle φ of the unwanted light must be larger than the largest view angle 2θ of the light beam that produces the normal image. If the light beam that produces the normal image and the unwanted light beam that produces the ghost image are made different in exit angle from each other as described above, it is possible to cut off only the ghost images by disposing a louver filter 20 between the prism array 14 and the eyeball 4, as shown in FIG. 14. The louver filter 20 comprises, as shown in the perspective view of FIG. 15, light-blocking (light-absorbing) walls 22 which are placed at equal intervals with a transparent member 21 interposed between each pair of adjacent light-blocking walls 22. Light that enters the louver filter 20 at an incident angle larger than a predetermined angle is absorbed by the light-blocking walls 22, and thus no unwanted light can emanate from the louver filter 20. It is also possible to use a field selecting glass represented by "Angle 21" (trade name), manufactured by Nippon Sheet Glass Co., Ltd., in place of the louver filter 20. The field selecting glass scatters light which enters it at an incident angle larger than a predetermined angle and thus prevents such light from passing through it. The use of such a field selecting member makes it possible to prevent a ghost image from being seen even if the user moves his/her eyeball 4 to a considerable extent.

Figure 16:
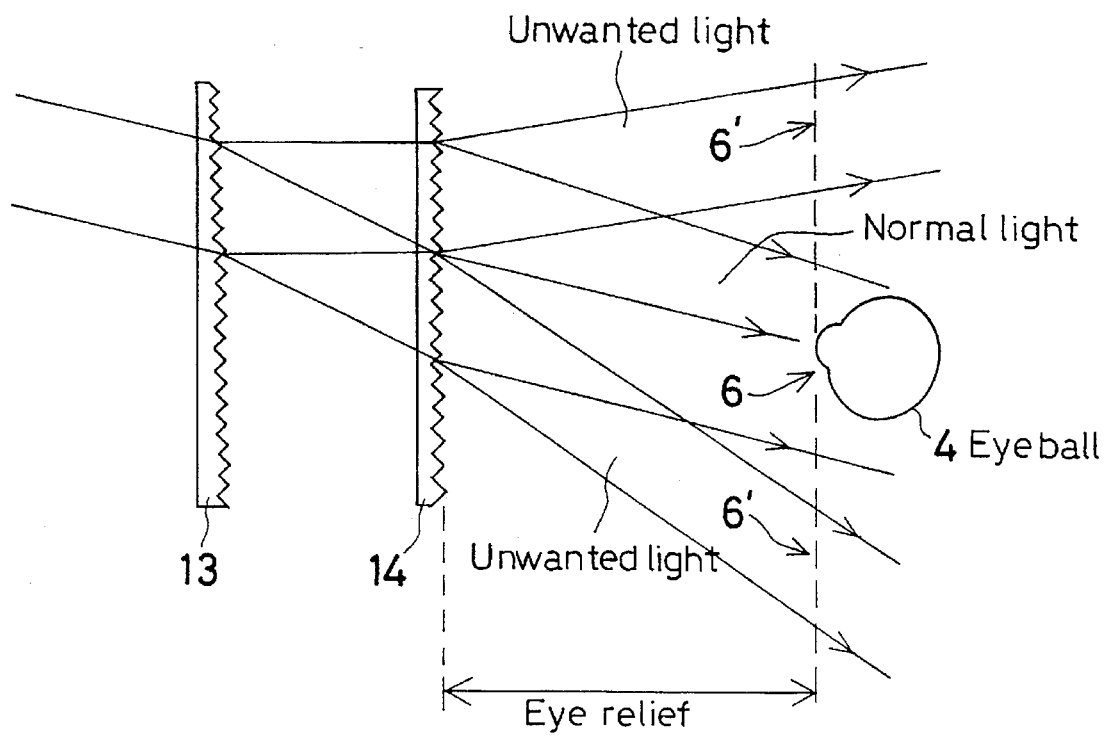
FIG. 16 shows the way in which unwanted light is cut off in a fourth embodiment of the present invention.

Fourth Embodiment:

Another embodiment which avoids the influence of ghost light will be explained below. As shown in FIG. 16, the eye relief of the display apparatus is elongated to thereby increase the distance from the prism array 14 to the eyeball 4. The above distance is set at about 20 mm, for example. As the eye relief is elongated as described above, the pupil position 6' of unwanted light and the pupil position 6 of normal light are sufficiently away from each other (e.g. 10 mm), so that no unwanted light enters the eyeball 4.

Figure 17:
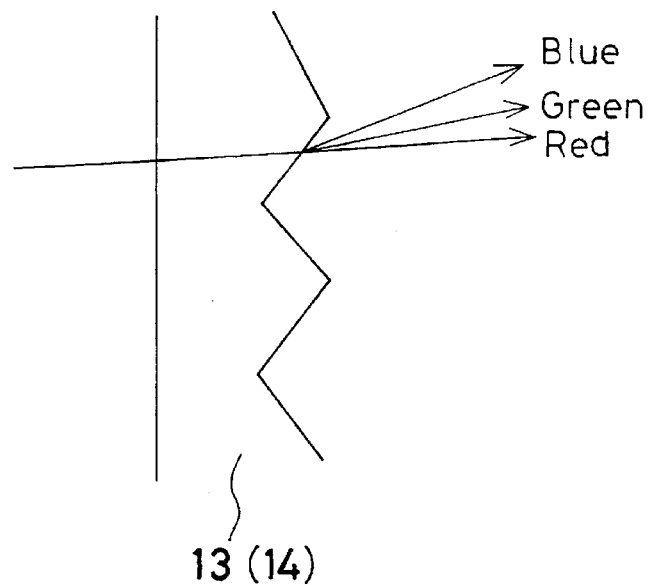
FIG. 17 shows the waveform dependence of the refraction angle of a prism array.

Fifth Embodiment:

Since the prism arrays 13, 14, 13' and 14' are refracting members, the angle of refraction of light caused by these members varies according to the wavelength of light. As shown schematically in FIG. 17, as the wavelength becomes shorter, light is refracted at a larger angle. Because of the dependence of the refraction angle on the wavelength, the pupil position varies according to the wavelength, and the color of the image undesirably changes as the eyeball 4 moves.

To prevent the above-described problem, low-dispersion glass is used as a glass material that constitutes the prism arrays 13, 14, 13' and 14'. It is preferable to use a glass material having an Abbe's number of 70 or more.

Figure 18:
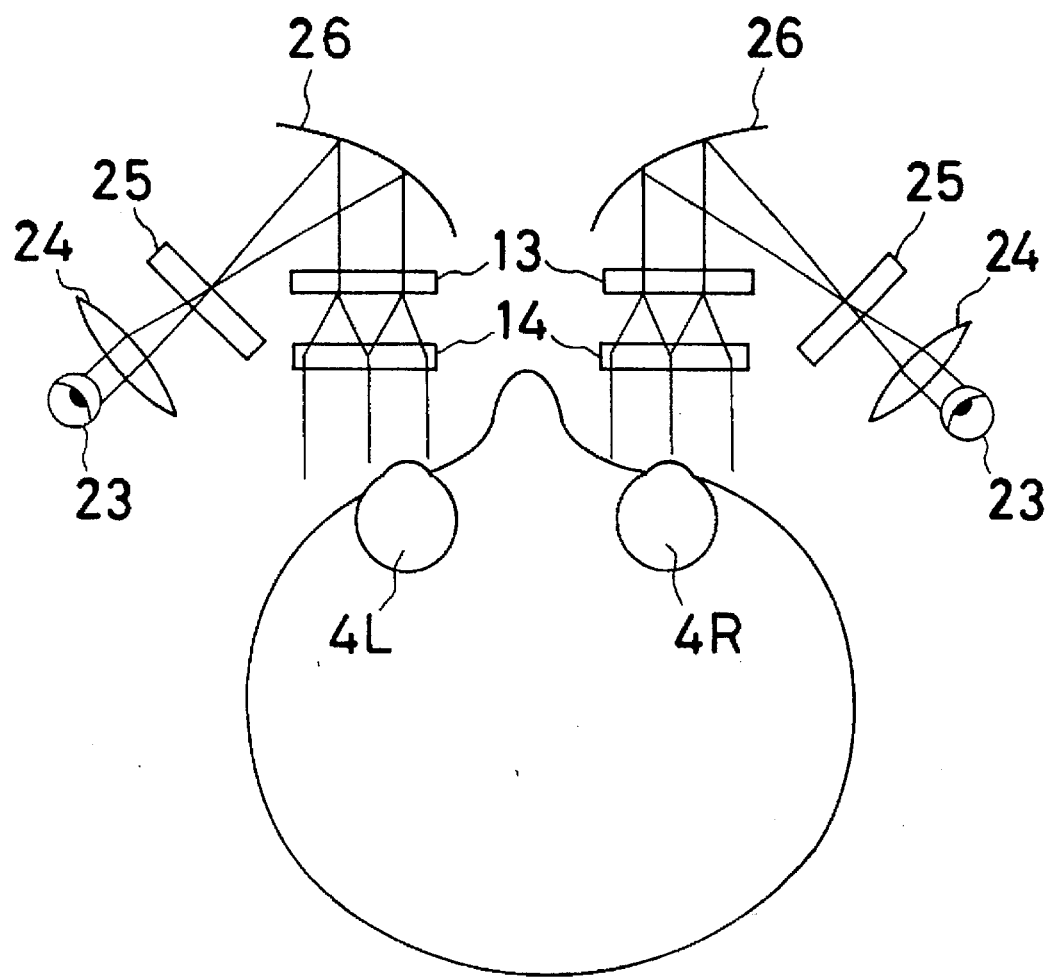
FIG. 18 shows an optical system of a head-mounted image display apparatus according to a sixth embodiment of the present invention.

Sixth Embodiment:

Next, an embodiment in which the pupil diameter-enlarging optical system according to the first embodiment is incorporated into an actual head-mounted image display apparatus will be shown. FIG. 18 shows one example of an optical system used in the head-mounted image display apparatus. In the illustrated head-mounted image display apparatus, symmetric optical systems are disposed for a right eye 4R and a left eye 4L. In each optical system, a liquid crystal display device 25 is illuminated by light from a point light source 23, e.g. a miniature bulb, with the numerical aperture thereof limited by a lens 24. Light from one point on the liquid crystal display device 25 is reflected by a concave mirror 26, which constitutes an ocular optical system, to become a parallel beam and, at the same time, it is bent toward the eye 4R (4L). The light beam is passed through the prism arrays 13 and 14 to enlarge the pupil diameter, and then enters the eye 4R (4L). By virtue of such an optical arrangement, the pupil diameter is enlarged, and it is possible to observe an enlarged image of wide field angle which is not eclipsed even when the user rotates his/her eyeball.

Figure 19:
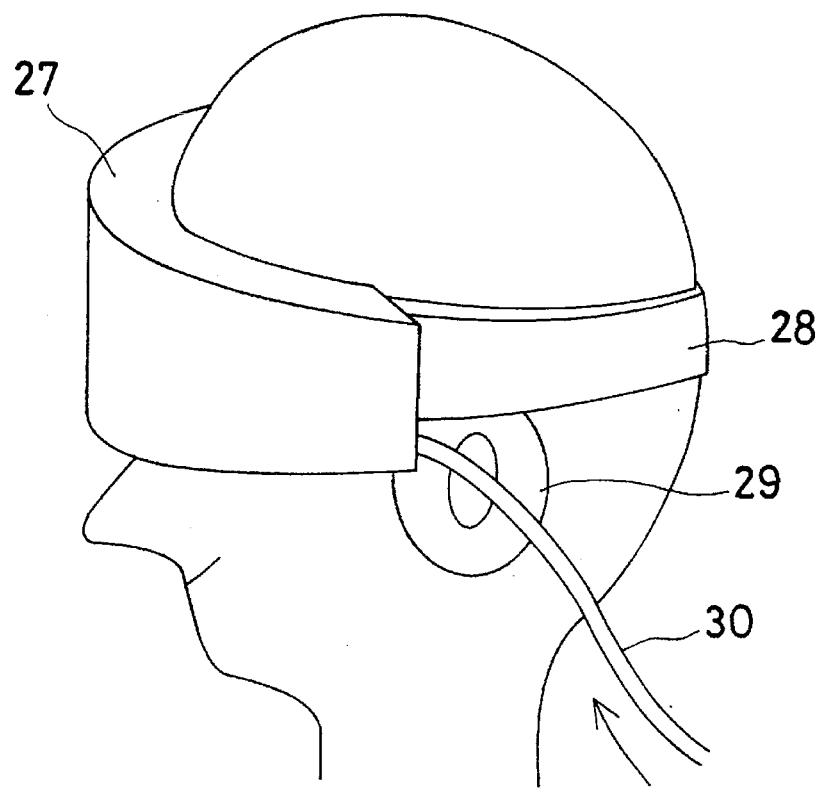
FIG. 19 shows the way in which the image display apparatus shown in FIG. 18 is fitted to the observer's head.

As shown in FIG. 19, the above-described optical systems and circuits for driving the liquid crystal display devices 25 and the light sources 23 are integrated into a head-mounted image display apparatus body 27, and the display apparatus body 27 is fitted to the observer's head with a headband 27. In the figure, reference numeral 29 denotes a earphone. Image information which is to be supplied to the liquid crystal display devices 25 and sound information which is to be supplied to the earphone 29 are sent from an image reproducing unit, e.g. a video recorder, to the display apparatus body 27 through a cord 30.

Figure 20:
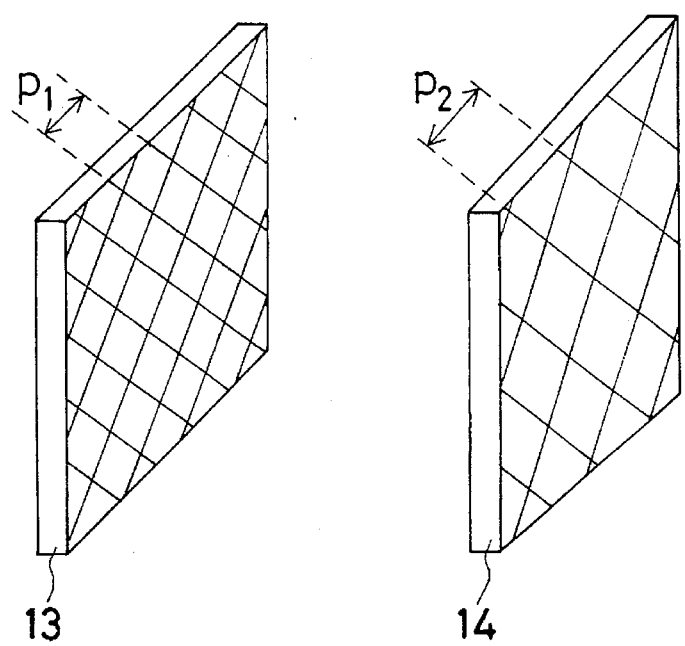
FIG. 20 shows period pitches of prism arrays.

Seventh Embodiment:

Incidentally, the pupil diameter-enlarging optical system according to the present invention has a pair of prism arrays 13 and 14 disposed in parallel to each other, as described above. Therefore, if the period pitch $P_1$ of the prism array 13, shown in FIG. 20, and the period pitch $P_2$ of the prism array 14, also shown in FIG. 20, are equal to each other, moiré fringes appear on the exit pupil 6 owing to slight manufacturing errors and installation angle errors of the prism arrays 13 and 14. The moiré fringes are superimposed on the projected image, causing the image quality to be deteriorated. In order to avoid the occurrence of moiré fringes, it is necessary to satisfy the following condition:

$p_2=(n+½)p_1$ or $p_1=(n+½)p_2$ (n is an integer)

For example, if $p_1$=50 μm, $p_2$=75 μm, 125 μm, 175 μm, . . .

It should be noted that it is preferable for $P_1$ or $P_2$ to fall within the following range:

$(n+½-¼)p_2<p_1<(n+½+¼)p_2$ or $(n+½-¼)p_1<p_2<(n+½+¼)p_1$ (n is an integer)

If the above condition is satisfied, no moiré fringes will readily appear.

Figure 21:
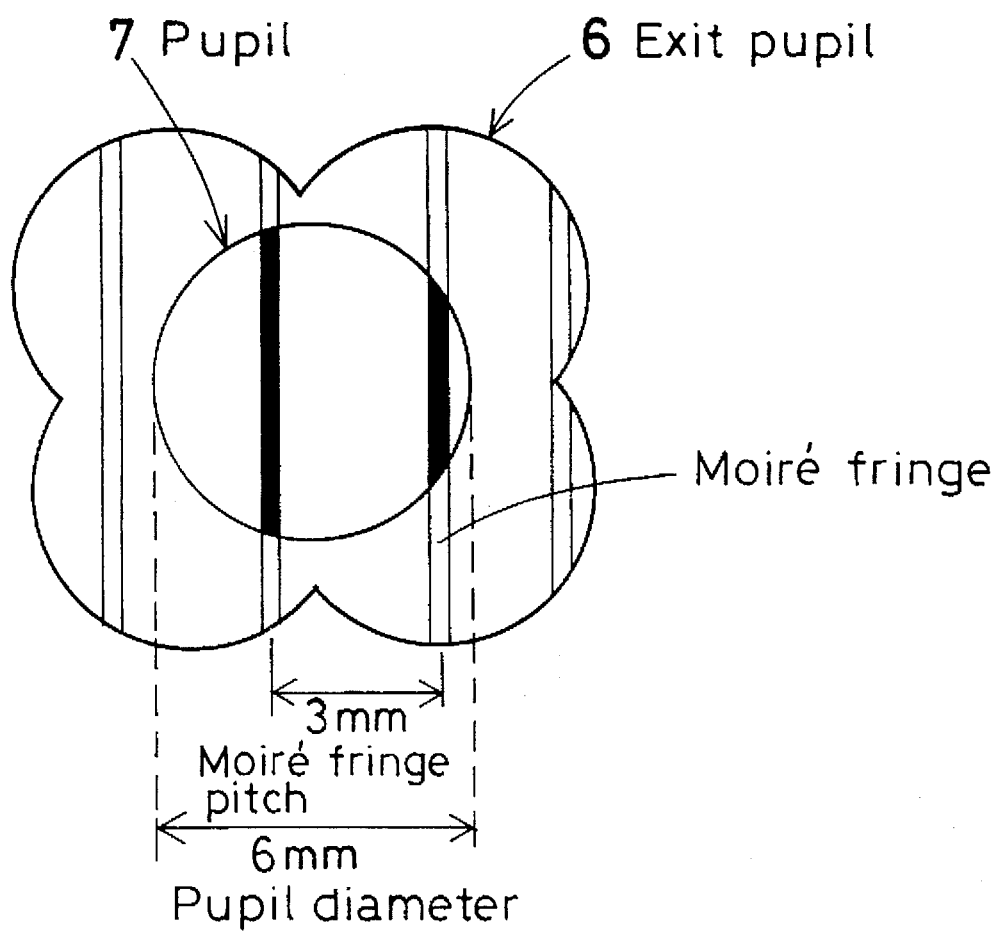
FIG. 21 shows the relationship between an exit pupil, an observer's pupil, and moiré fringes.

Even if moiré fringes appear on the exit pupil 6, no problem arises as long as the pitch of the moiré fringes is sufficiently small. The largest moiré fringe pitch that is allowable is a half of the observer's pupil diameter, as shown in FIG. 21. When the moiré fringe pitch is equal to a half of the observer's pupil diameter, there is no change of the light quantity within the pupil 7 even when the observer moves his/her eye. Since the largest eye pupil diameter is about 6 mm, the moiré fringe pitch should satisfy the following condition:

$|p_1 \cdot p_2/(p_1-p_2)| \leq 3$ (mm)

For example, if $p_1$=0.05 mm, $P_2$ should be not more than 0.049 mm or not less than 0.051 mm.

Figure 22:
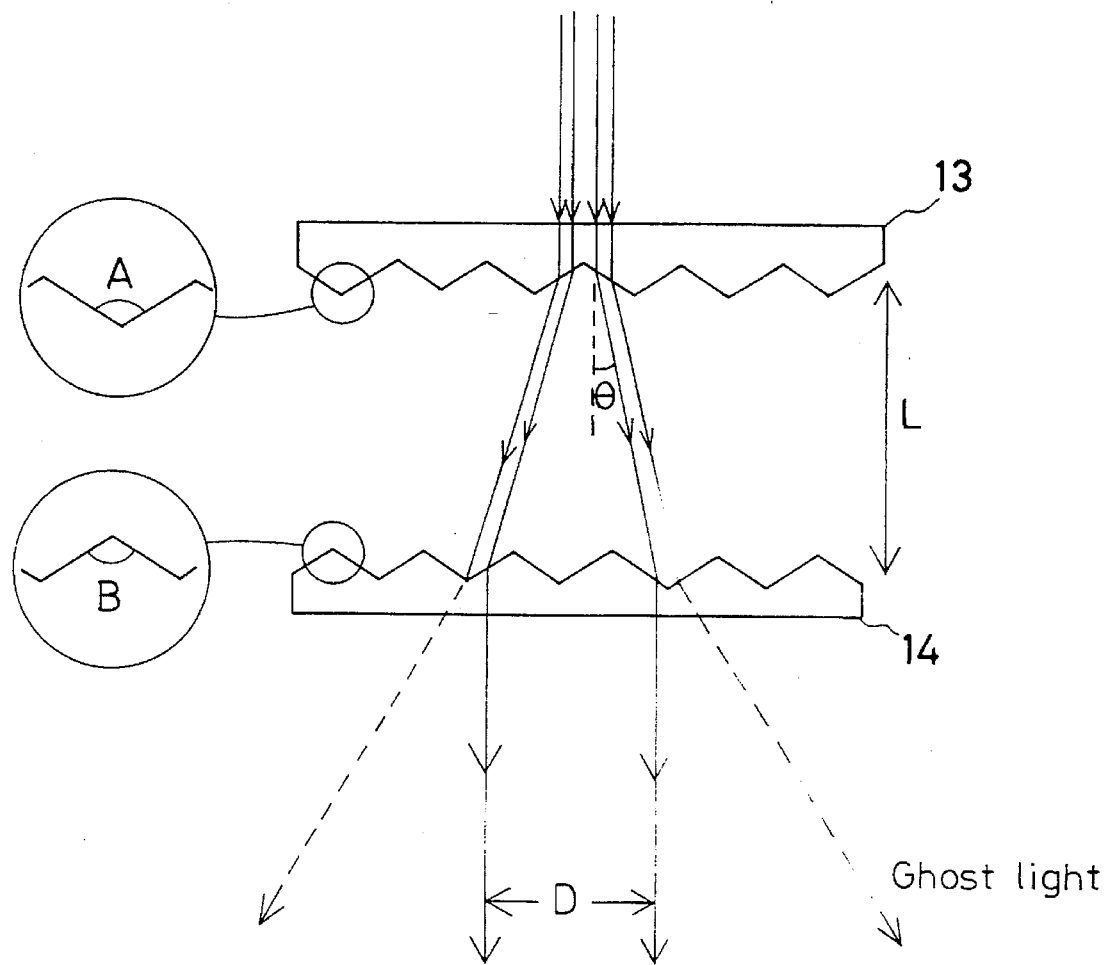
FIG. 22 shows the way in which the pupil diameter is enlarged in an eighth embodiment of the present invention.

Eighth Embodiment:

FIG. 22 shows the way in which light successively enters a pair of prism arrays 13 and 14 and thus separates into two light beams, resulting in enlargement of the exit pupil diameter. In this case, if the vertex angles (angles A and B as shown in enlarged views in FIG. 22) of the two prism arrays 13 and 14 are not equal to each other (A≠B), the incident angle of light entering the first prism array 13 and the exit angle of light emanating from the second prism array 14 are different from each other. As a result, the image is distorted. The prism vertex angle A (=B), the distance L between the two prism arrays 13 and 14, and the light ray separating distance D are related to each other as follows:

$D=2L \cdot \tan[(A/2)-\cos^{-1}\{n \cdot \cos(A/2)\}]$ where n is the refractive index of the constituent material of the prism arrays 13 and 14.

It should, however, be noted that the above expression is the relation between A, D and L in a state where the prism surfaces face each other, as shown in FIG. 22.

Assuming, for example, that the prism array material is an acrylic resin, and the separating distance D is 3.2 mm, and that the prism vertex angle A is 140°, the distance L is 8.47 mm.

To obtain a predetermined separating distance D, the exit angle of light emanating from the first prism array 13 must be properly set. In other words, the extent to which the exit pupil can be enlarged depends on the exit angle of light from the first prism array 13. That is, when D is constant in FIG. 22, L becomes shorter as the exit angle θ of light from the first prism array 13 increases. The exit angle θ depends on the vertex angle A of the first prism array 13; as the vertex angle A decreases, the exit angle θ increases. That is, as the vertex angle A decreases, the distance L becomes shorter, and thus the pupil diameter-enlarging optical system can be made compact.

Figure 23:
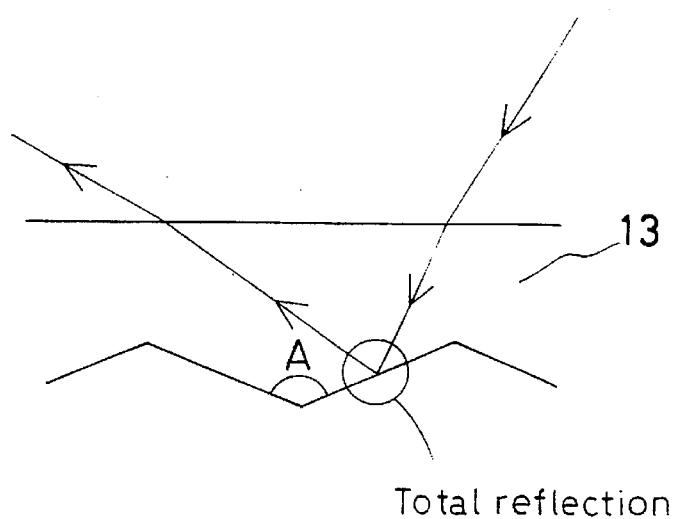
FIG. 23 shows the way in which a light ray from a peripheral portion of a displayed image is totally reflected by a prism array.

However, in the case of a glass or acrylic resin material having a refractive index n of about 1.5, if the vertex angle A is 120° or less, a light ray from a peripheral portion of the displayed image is totally reflected by the prism array 13, as shown in FIG. 23. In the case of a high-refractive index glass material having a refractive index n of about 1.85, the total reflection occurs at a vertex angle A of 135° or less. Accordingly, it is preferable to set the vertex angle A at 120° or more in order to lead a wide-screen image to an observer's eye as in the case of a head-mounted image display apparatus. If the field angle is 60° or more, the requirement becomes more stringent; the vertex angle A is preferably 140° or more.

Figure 24A:
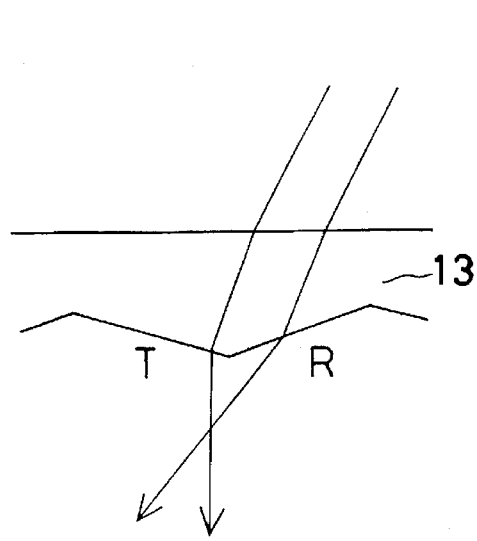
FIGS. 24(a) and 24(b) show two different types of surface of prism arrays.
Figure 24B:
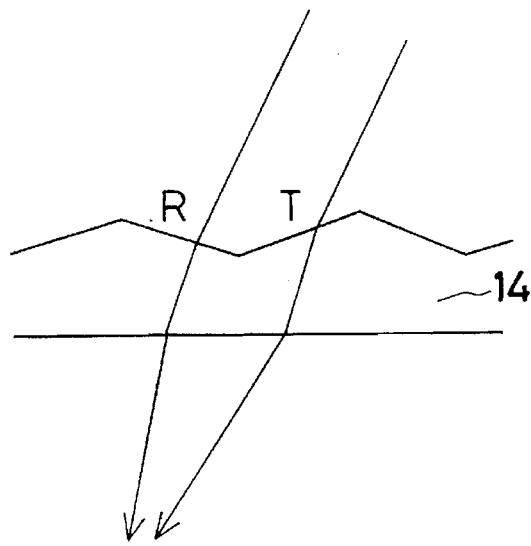
Figure 25:
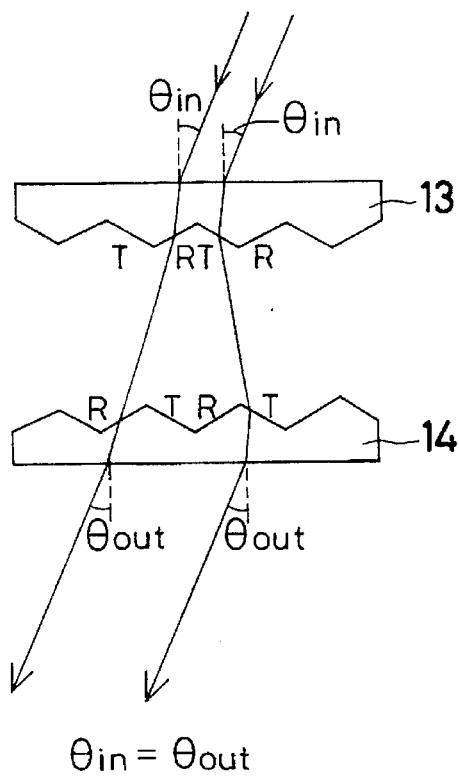
FIG. 25 shows light passing through the same type of surface of two prism arrays.
Figure 26:
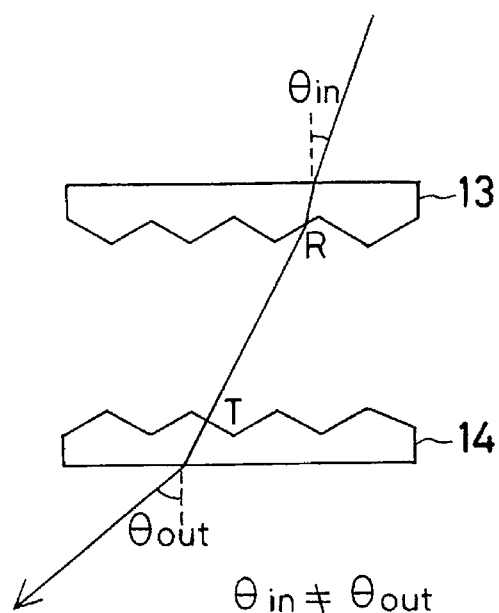
FIG. 26 shows light passing through different types of surface of two prism arrays.
Figure 27:
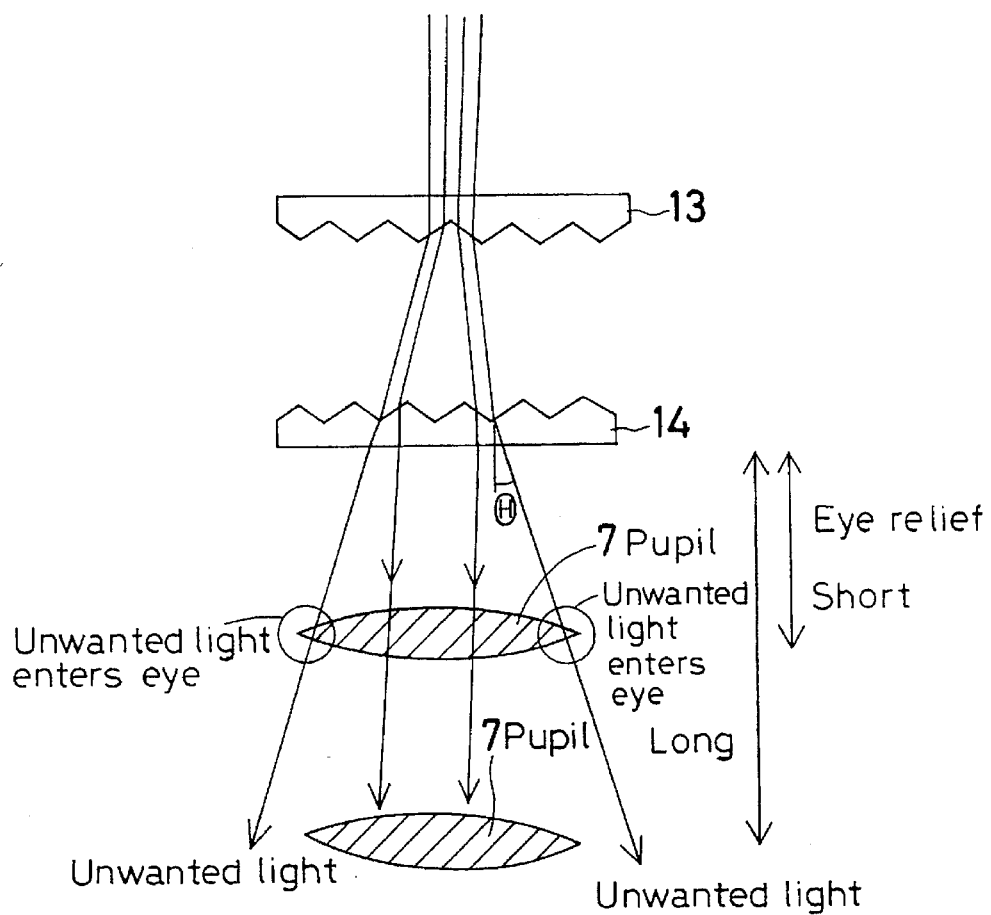
FIG. 27 illustrates the relationship between the eye relief and the possibility of unwanted light entering the eyeball.

However, if the vertex angle A is excessively large, i.e. 160° or more, the following problem arises: As shown in FIGS. 24(a) and 24(b), the prism arrays 13 and 14 have two different types of surface. A surface which does not totally reflect light entering the prism array from behind it at a positive angle is defined as a surface T, and a surface which readily causes total reflection of such incident light is defined as a surface R. When light is to be separated through a pair of prism arrays 13 and 14 to enlarge the exit pupil diameter, if light passes through the same type of surface (T or R) at both the prism arrays 13 and 14, as shown in FIG. 25, the angle $θ_{in}$ at which the light enters the first prism array 13 and the angle $θ_{out}$ at which the light emanates from the second prism array 14 become equal to each other, i.e. $θ_{in}=θ_{out}$, and thus a nondistorted image can be seen. However, if light passes through different types of surface (the surface T at the first prism array 13, and the surface R at the second prism array 14; or the surface R at the first prism array 13, and the surface T at the second prism array 14), the incident and exit angles are not equal to each other ($θ_{in} \neq θ_{out}$). If this light enters the observer's eye, it becomes ghost or flare, that is, unwanted light. To increase the exit angle Θ (see FIG. 27) of unwanted light so that the unwanted light is unlikely to fall within the movable range of the observer's pupil 7, the prism vertex angle A is preferably set at 145° or less. As shown in FIG. 27, even when the vertex angle A is the same, if the distance from the second prism array 14 to the pupil 7, that is, eye relief, is short, the unwanted light is likely to enter the eye, whereas, if the eye relief is long, the unwanted light is unlikely to enter the eye. The numerical value of the vertex angle A herein mentioned is based on the eye relief of 20 mm, which is considered to be appropriate for a head-mounted image display apparatus. When a high-refractive index glass material is used, or the field angle is as wide as 60° or more, the vertex angle A is allowed to widen up to 160°.

To sum up, when the field angle is in the range of from 30° to 45°, and the refractive index is about 1.5, the vertex angle A is preferably set in the range of from 120° to 140°; when the field angle is 60° or more, or the refractive index is high, the vertex angle A is preferably set in the range of from 140° to 160°. When the vertex angle A is within the above-described range, the projected image has minimal brightness unevenness.

Figure 28:
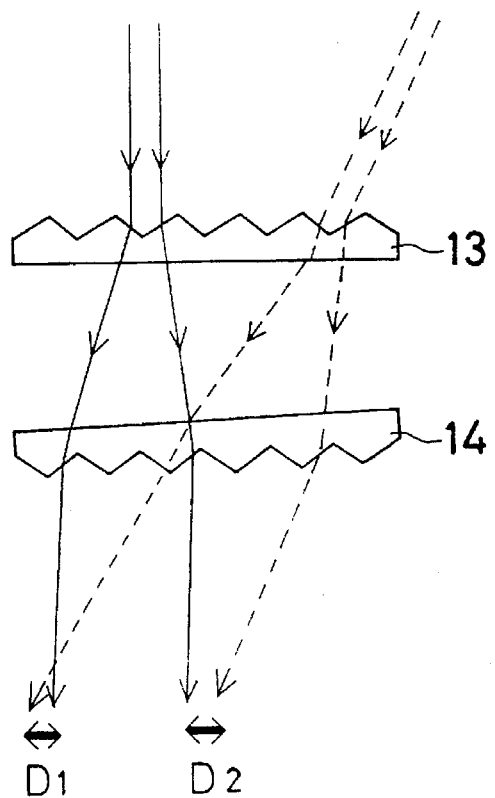
FIG. 28 shows the way in which the pupil diameter is enlarged in a ninth embodiment of the present invention.
Figure 29A:
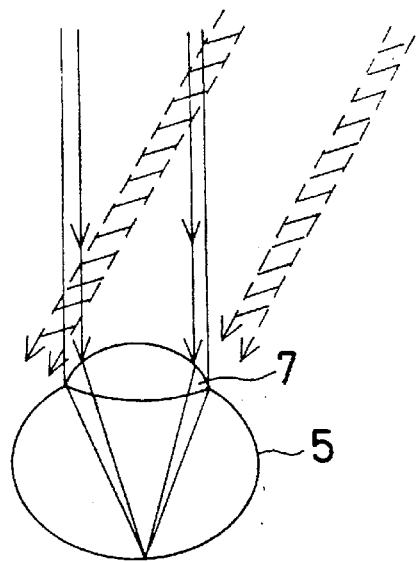
FIGS. 29(a) and 29(b) show the way in which light rays enter the eyeball depending upon the amount of displacement in the ninth embodiment.
Figure 29B:
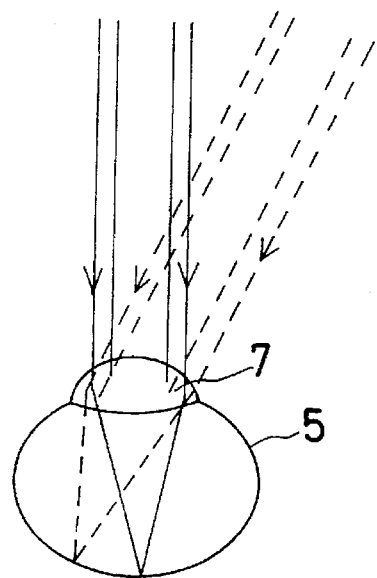

Ninth Embodiment:

This embodiment is of the type in which, as shown in FIG. 28, the first prism array 13 and the second prism array 14 are disposed such that the back surfaces thereof, which are reverse to the prism surfaces, face each other. The feature of this type of optical system resides in that light rays of different incident angles pass through the two prism arrays 13 and 14 and reach the pupil plane with minimal amounts of displacement $D_1$ and $D_2$. If the amount of displacement is exceedingly large, light entering the observer's eye becomes partly invisible according to the observer's pupil position. FIGS. 29(a) and 29(b) show the way in which light rays enter the observer's pupil 7 depending upon the amount of displacement. For example, in the case of FIG. 29(a), the amount of displacement is so large that light rays shown by the dotted lines are invisible, although light rays shown by the solid lines are visible. However, if the amount of displacement is sufficiently small, even light rays having a large incident angle all enter the pupil 7, as shown in FIG. 29(b). Therefore, the projected image can be observed as far as the periphery thereof without eclipse.

Figure 30:
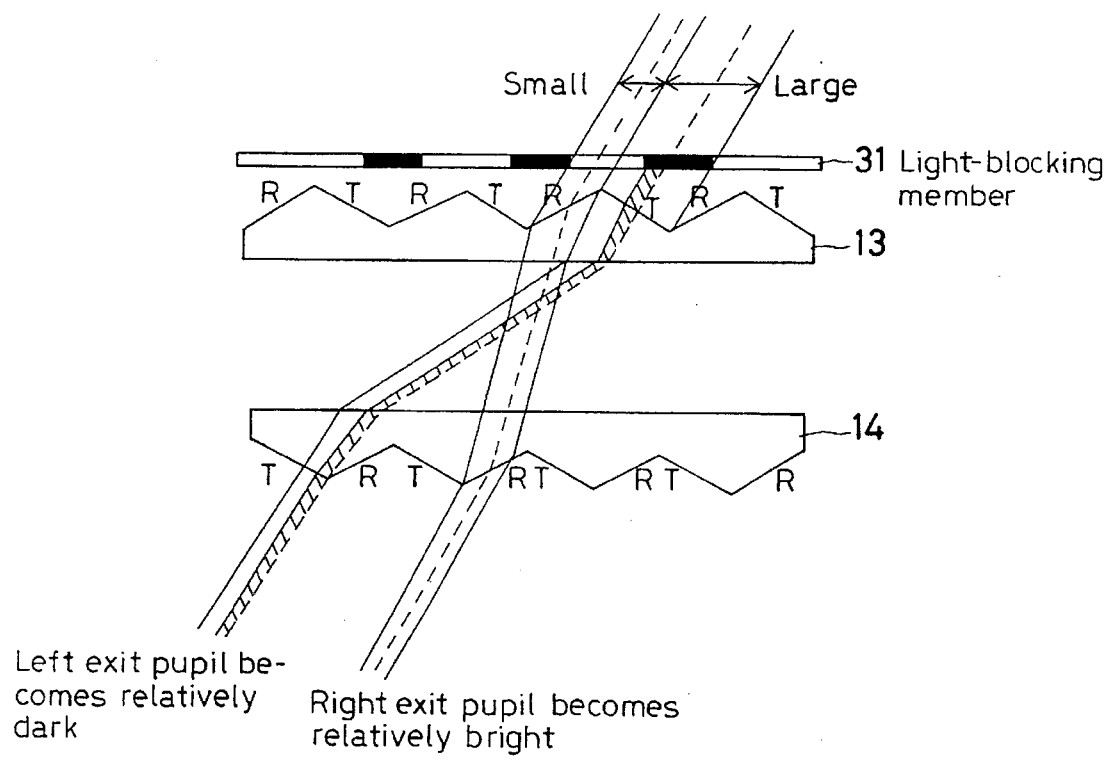
FIG. 30 shows the way in which the brightness of an exit pupil separated in the direction of the observer's line of sight becomes relatively high in a tenth embodiment of the present invention.
Figure 31:
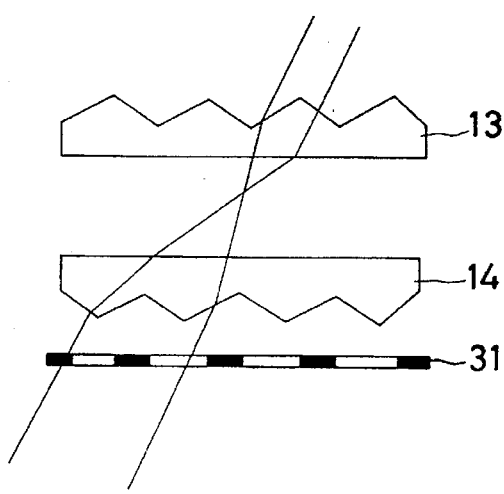
FIG. 31 shows a modification of the arrangement shown in FIG. 30.

Tenth Embodiment:

In this embodiment, a member for blocking a part of light to be separated is provided at the entrance side of the first prism array 13, from which light for forming an exit pupil enters the system, in the optical system in which the first and second prism arrays 13 and 14 face each other at their back surfaces, which are reverse to the prism surfaces, as shown in the ninth embodiment. As shown in FIG. 30, among light rays which enter the optical system from the right-hand side, light that passes through a surface T at the first prism array 13 and also through a surface T at the second prism array 14 separates leftward, whereas light that passes through surfaces R at both the prism arrays 13 and 14 separates rightward. If there is no light-blocking member, light that passes through surfaces T at both the prism arrays 13 and 14 and separates leftward is relatively bright because the area of incidence on the first prism array 13 is relatively large. Therefore, a light-blocking member 31 is disposed at the entrance side of the first prism array 13, as illustrated in FIG. 30, such that transparent portions (white portions in the figure) lie at positions corresponding to the vicinities of the prism vertices of the first prism array 13, whereas light-blocking walls (black portions in the figure) lie at positions corresponding to the vicinities of the prism troughs. Consequently, light that passes through surfaces T at both the prism arrays 13 and 14 and separates leftward is partly blocked (the hatched portion in the figure) without blocking light that passes through surfaces R at both the prism arrays 13 and 14 and separates rightward. As a result, the brightness of the right exit pupil becomes relatively high. Similarly, with regard to light entering the optical system from the left-hand side, the brightness of the exit pupil separating leftward becomes relatively high by virtue of symmetry. This means that the projected image looks natural because the brightness of the exit pupil separating in the direction of the incident light, that is, in the direction of the observer's line of sight becomes relatively high. The light-blocking member 31 may be disposed at the entrance side of the pair of prism arrays 13 and 14, as shown in FIG. 30. Alternatively, the light-blocking member 31 may be disposed at the exit side of the prism arrays 13 and 14, as shown in FIG. 31.

Eleventh Embodiment:

FIGS. 32(a) and 32(b) are sectional and perspective views, respectively, which show an embodiment in which a prism array surface 18 constituting a first prism array is provided on one side of a single optical member 32, and a prism array surface 18' constituting a second prism array is provided on the other side of the optical member 32, which is reverse to the side that is provided with the prism array surface 18. The feature of this embodiment resides in that the above-described amounts of displacement $D_1$ and $D_2$ are small and the brightness unevenness of the projected image is minimal because light entering the first prism array surface 18 does not pass through any medium having a refractive index different from that of the first prism array surface 18. Although in FIGS. 32(a) and 32(b) one-dimensional array surfaces are provided on the optical member 32, two-dimensional array surfaces may be provided, as shown in FIG. 33. That is, arrays of quadrangular pyramids 15 and 15' may be provided on both sides of the optical member 32 in the same way as in the first embodiment.

Figure 34:
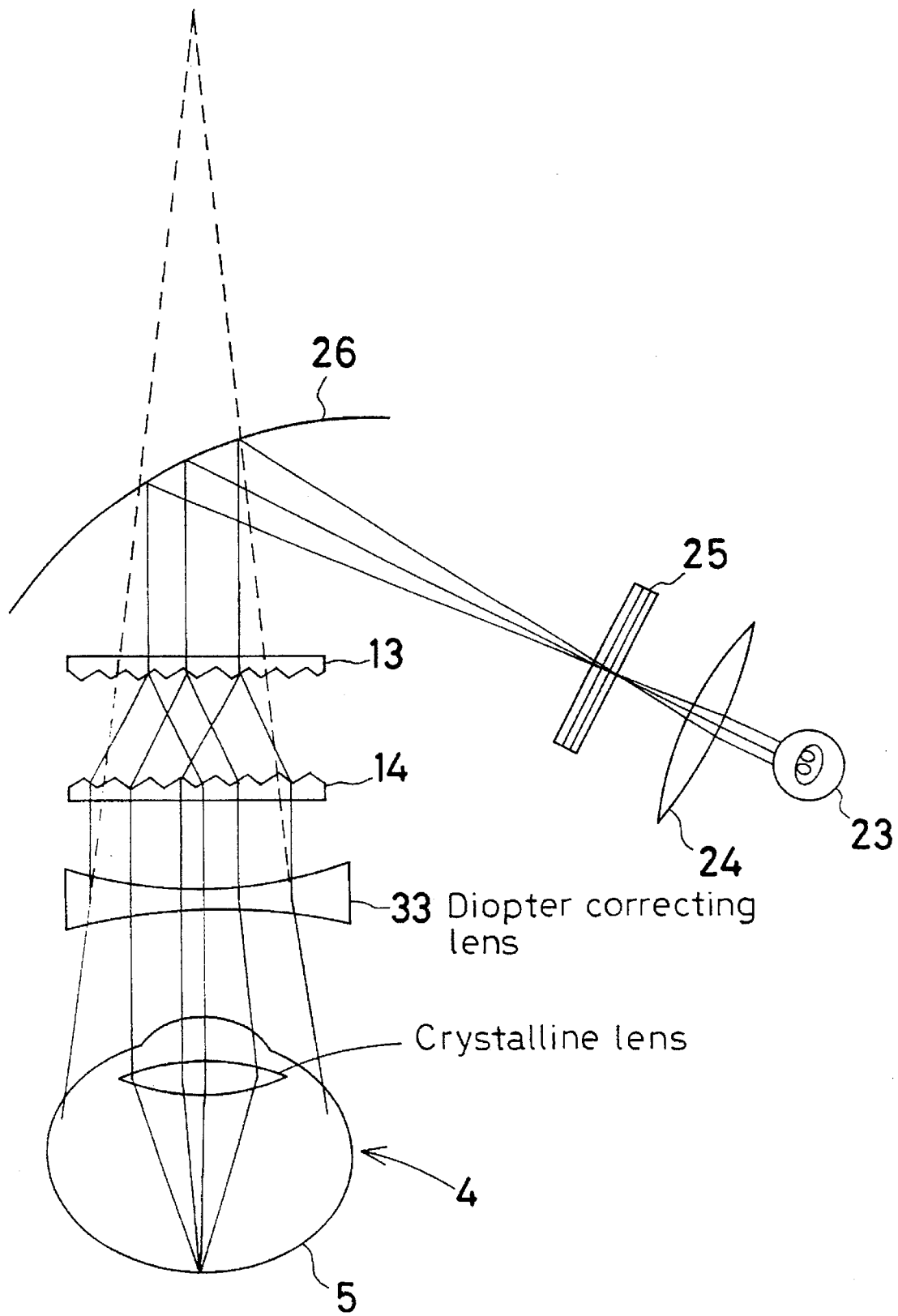
FIG. 34 shows the arrangement of a twelfth embodiment of the present invention.

Twelfth Embodiment:

FIG. 34 shows an embodiment in which a diopter correcting lens 33 is inserted in between the pair of prism arrays 13 and 14 and the eye 4 in an optical arrangement as in the sixth embodiment, thereby forming a virtual image at a position where the projected image is easy to see. A liquid crystal display device 25 is illuminated by light from a point light source 23 with the numerical aperture limited by a lens 24. The liquid crystal display device 25 is disposed at the focal point of a concave mirror 26. Light from the liquid crystal display device 25 is formed into a parallel beam by the concave mirror 26, and then enters the prism arrays 13 and 14.

In this case, the diopter correcting lens 33 has a diopter in the range of from −1 to −5. Light that is focused at infinity by the concave mirror 26 enters the eye 4 through the diopter correcting lens 33. At this time, the virtual image position is at 200 mm to 1,000 mm, which is a distance at which the image is easy for the observer to see. Accordingly, it is easy for the observer to focus his/her eyes, and no double image is observed.

Figure 35:
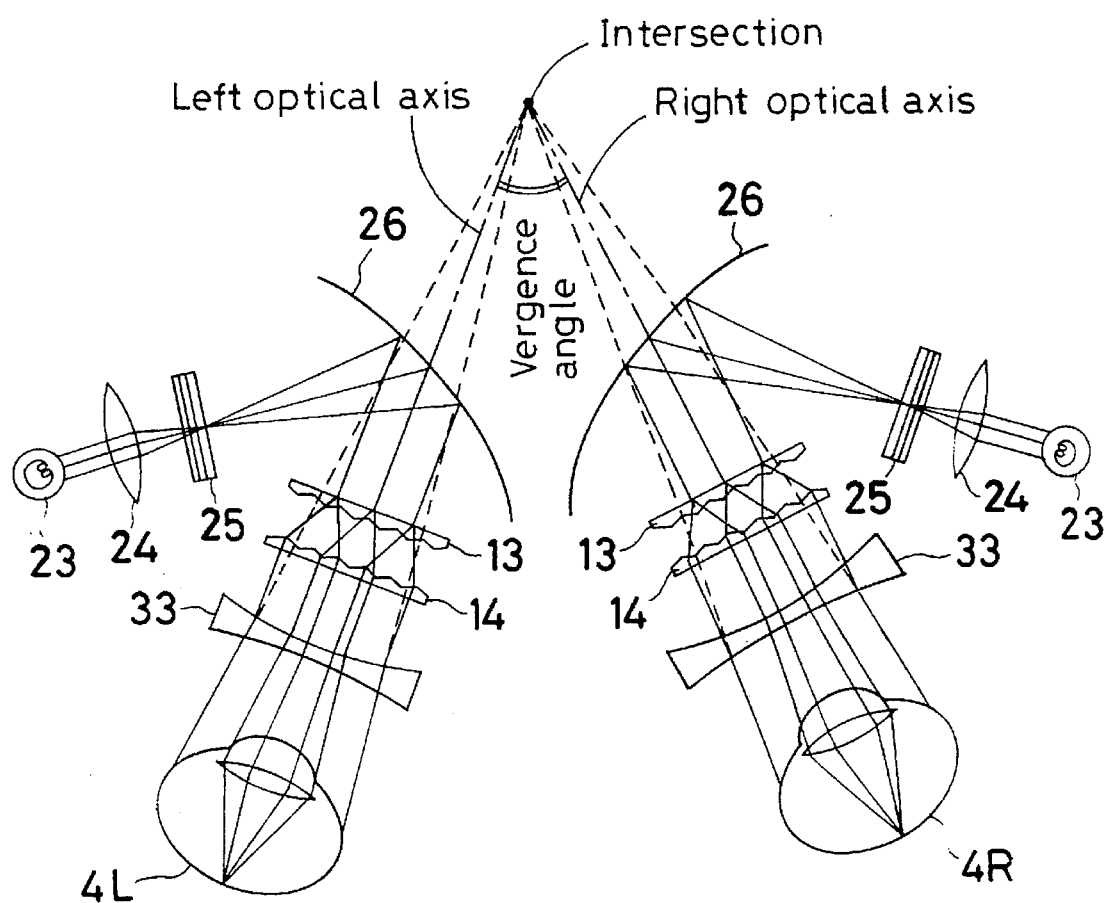
FIG. 35 shows the arrangement of a thirteenth embodiment of the present invention.

Thirteenth Embodiment:

In this embodiment, the diopter of diopter correcting lenses and the vergence angle made between left and right optical systems are matched with each other. FIG. 35 shows an example in which the left and right optical systems are decentered. For example, when diopter correcting lenses 33 having a dioper of −1 are used, the optical systems are tilted at 1.8° with the spacing between the two eyes assumed to be 65 mm. If the user tries to look at the center of the displayed image with both left and right eyes 4L and 4R, the left and right eyeballs 4L and 4R rotate inwardly. The angle at which the visual axes intersect each other at that time is called "vergence angle". By matching the diopter with the distance to the point of intersection between the two visual axes, it becomes easier for the observer to focus his/her eyes, and it is possible to prevent occurrence of a double image.

Although in FIG. 35 the whole optical system is tilted in order to provide a vergenee angle, the same effect can be produced by shifting the positions of the liquid crystal display device 25 inwardly, or by allowing the liquid crystal display device 25 to display images so that the displayed image are shifted inwardly.

Figure 36:
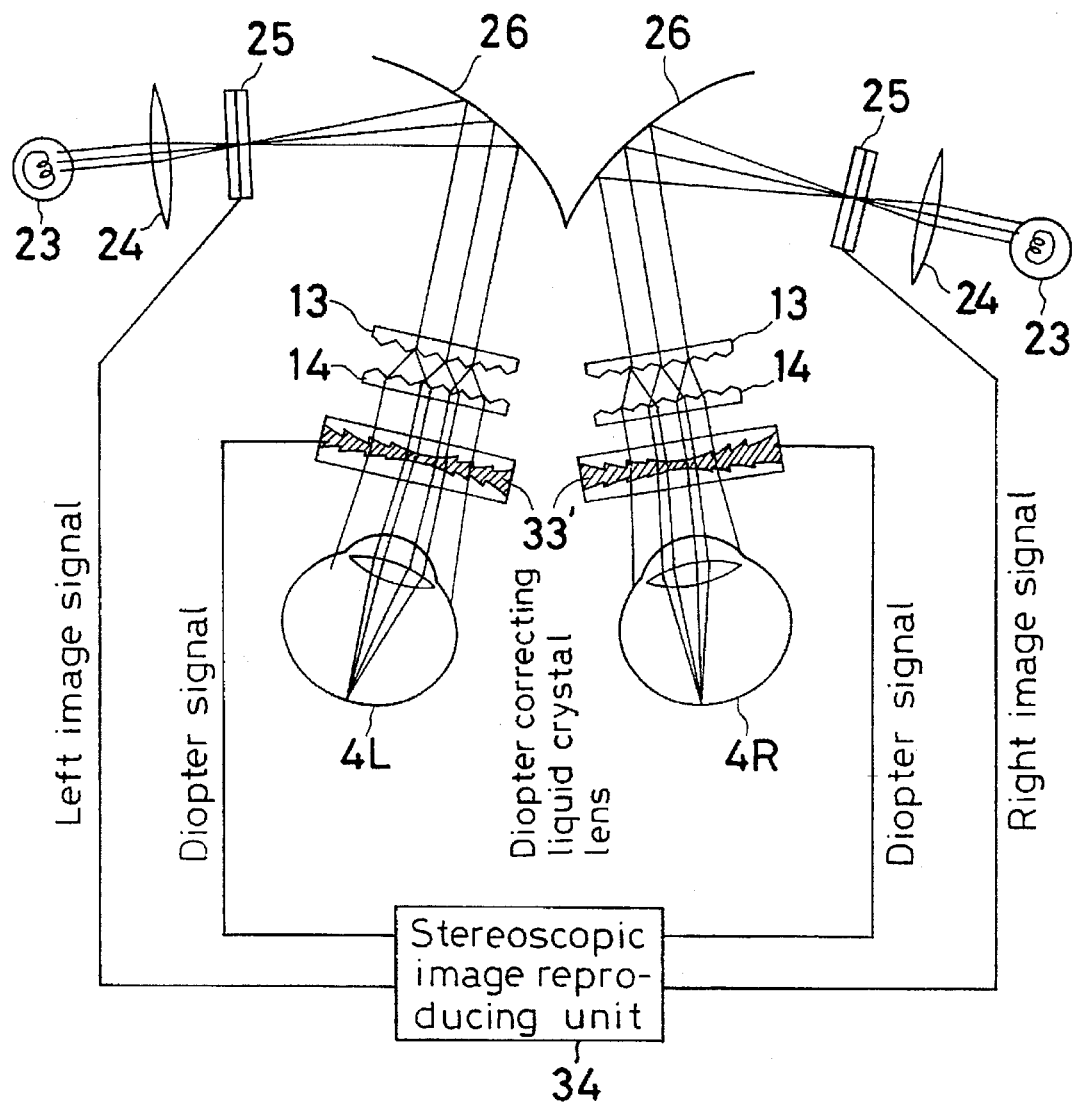
FIG. 36 shows the arrangement of a fourteenth embodiment of the present invention.

Fourteenth Embodiment:

In this embodiment, a stereoscopic image is displayed, and the diopter is changed in accordance with the diopter of the stereoscopic image. In the case of stereoscopic images, the diopter varies according to images. That is, the vergence angle varies. Therefore, the diopter is also changed so as to conform to the vergenee angle. One example of this method is shown in FIG. 36. A stereoscopic image reproducing unit 34 outputs left and right image signals to liquid crystal display devices 25 to display a stereoscopic image. The stereoscopic image reproducing unit 34 also outputs diopter signals synchronized with the left and right image signals. The system shown in FIG. 36 uses diopter correcting liquid crystal lenses 33' in which a liquid crystal material is sealed so that the refractive index changes with the applied voltage, causing the focal length to change. Accordingly, the diopter of each virtual image changes in accordance with the output diopter signal. In this embodiment, although a stereoscopic image is displayed, no double image is seen because the vergence angle and the diopter match each other. As a method of generating diopter signals, it is possible to adopt a method in which diopter signals have previously been generated and recorded, and necessary diopter signals are outputted, as in this embodiment. It is also possible to employ a method in which observer's lines of sight and the spacing between his/her two eyes are detected to obtain a vergence angle, and diopter signals are calculated on the basis of the detected data and outputted.

The above-described diopter adjustment is effective not only for a stereoscopic image but also an image projected to be seen with one eye. This is because an observable virtual image position varies for each nearsighted or farsighted user wearing no glasses. Diopter correcting lenses usable in this embodiment are not necessarily limited to the liquid crystal lenses 3', but may be a combination of concave and convex lenses which are arranged so that the diopter is adjusted by varying the spacing between the two lenses.

Figure 37:
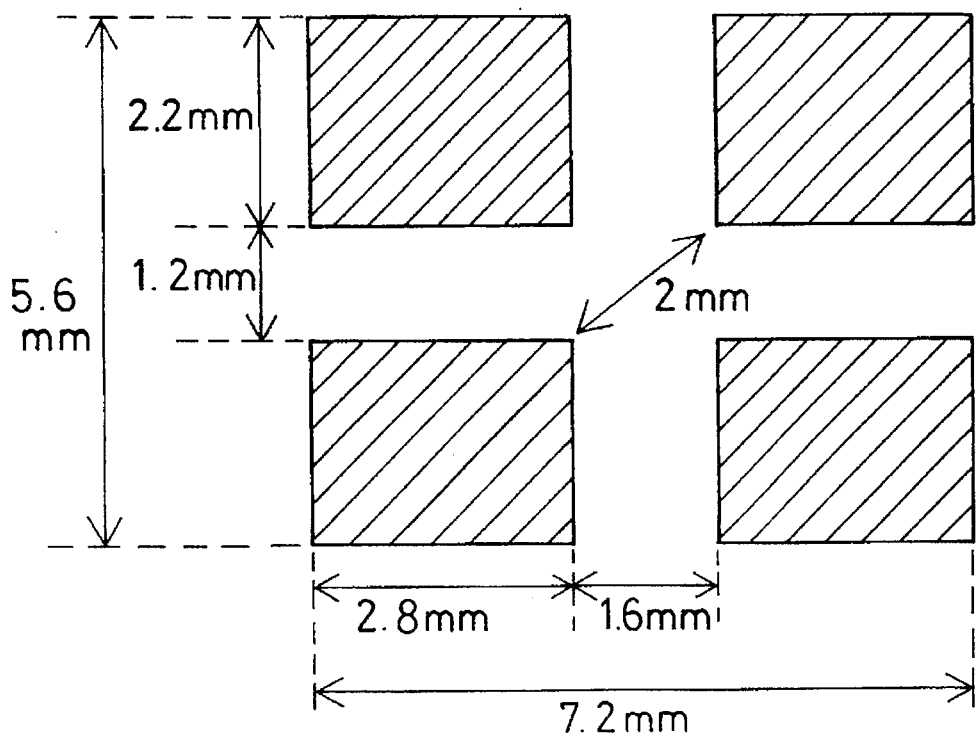
FIG. 37 shows a pupil configuration in a fifteenth embodiment of the present invention and also illustrates the way in which the pupil diameter is enlarged in the fifteenth embodiment.
Figure 38:
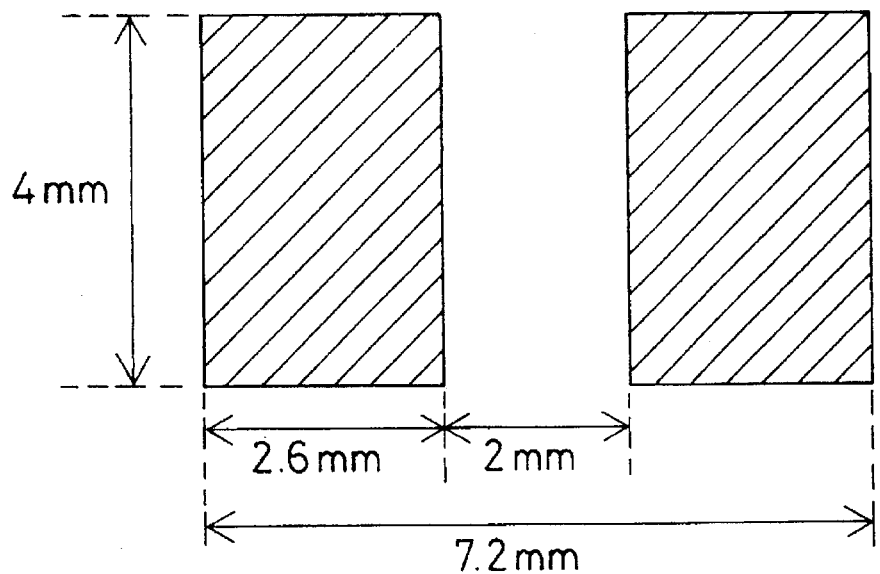
FIG. 38 shows another pupil configuration in the fifteenth embodiment and also illustrates the way in which the pupil diameter is enlarged.

Fifteenth Embodiment:

In this embodiment, the exit pupil does not have a circular shape as shown in FIG. 8, but it has a shape other than it. For example, a square pupil is used, as shown in FIG. 37. An exit pupil which is 7.2 mm in the horizontal direction and 5.6 mm in the vertical direction is needed in order to allow an image having an aspect ratio of 4:3 to be seen at a horizontal field angle of 45° without eclipse. To form an exit pupil of that size, four rectangular pupils each of which is 2.8 mm in the horizontal direction and 2.2 mm in the vertical direction are disposed with a space of 1.6 mm in the horizontal direction and with a space of 1.2 mm in the vertical direction, as illustrated in the figure. The horizontal space of 1.6 mm and the vertical space of 1.2 mm give rise to no problem because these spaces are smaller than the pupil diameter of the observer's eyeball. Such rectangular pupils enable the necessary exit pupil to be efficiently formed. FIG. 38 shows the shape of an exit pupil in a case where the horizontal field angle is 45°, and the aspect ratio is 16:9. Two elongated rectangular pupils each of which is 2.6 mm in the horizontal direction and 4 mm in the vertical direction are disposed side by side with a space of 2 mm. In this case, the loss of light quantity is minimized because only two pupils need to be formed.

Figure 39:
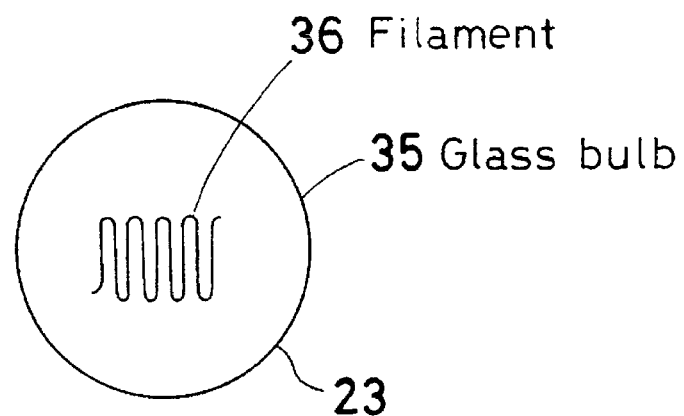
FIG. 39 is a front view of a light source for forming a rectangular pupil in a sixteenth embodiment of the present invention.

Sixteenth Embodiment:

In this embodiment, an illumination optical system for forming a rectangular pupil as in the fifteenth embodiment is shown. FIG. 39 is a front view of a light source 23 which has a square filament 36 in a glass bulb 35. In this case, the resulting pupil is also square.

Figure 40:
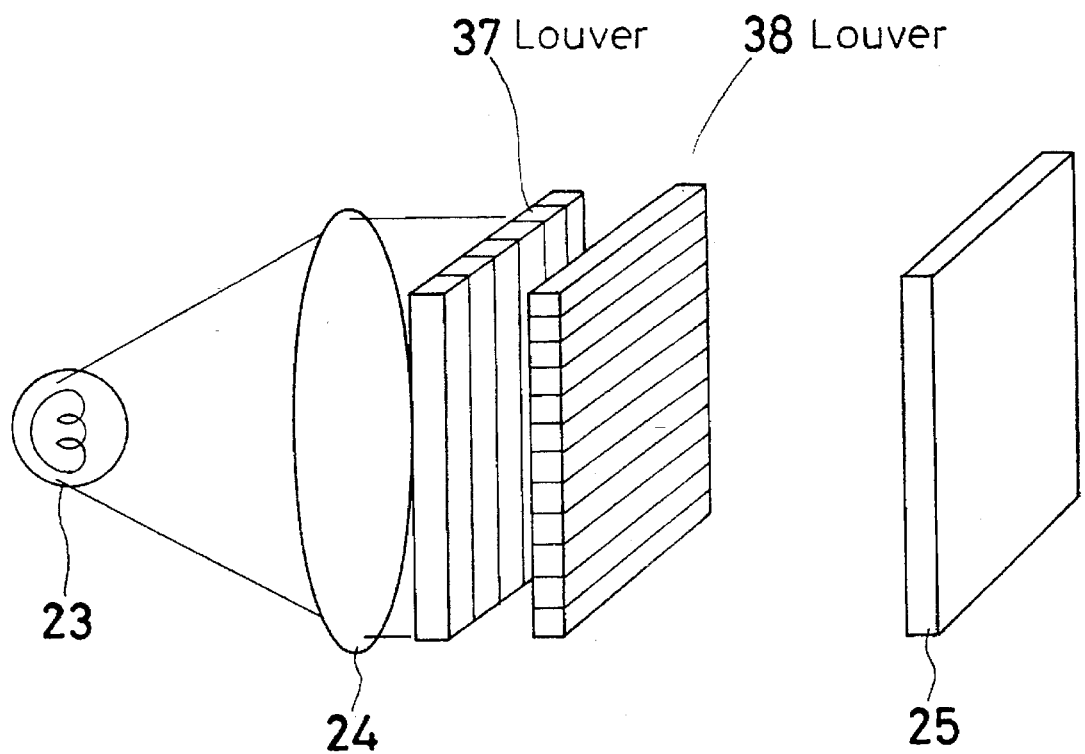
FIG. 40 shows the arrangement of an illumination system for forming a rectangular pupil in the sixteenth embodiment.

FIG. 40 shows an illumination system that makes use of louvers. A louver comprises a transparent member having light-absorbing walls which are periodically put therein in parallel to limit the angle at which light emanates from it. In the case of FIG. 40, a louver 37 which limits the horizontal divergence angle and a louver 38 which limits the vertical divergence angle are successively disposed in a bundle of light rays which are emitted from the light source 23 and passed through the lens 24 to illuminate the liquid crystal display device 25 with approximately parallel rays, thereby enabling a square pupil to be formed.

Figure 41A:
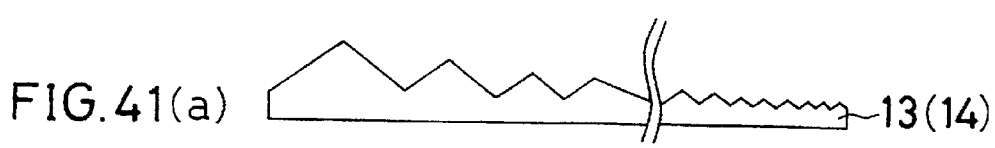
FIGS. 41(a) to 41(f) are sectional views showing various modifications of prism arrays in a seventeenth embodiment of the present invention.
Figure 41B:
Figure 41C:
Figure 41D:
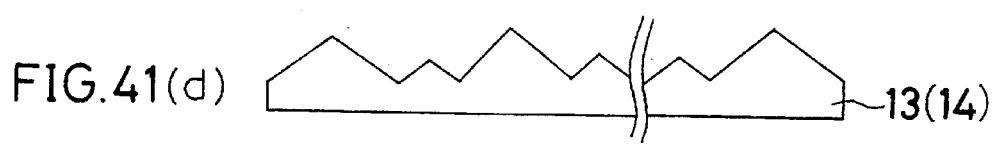
Figure 41E:
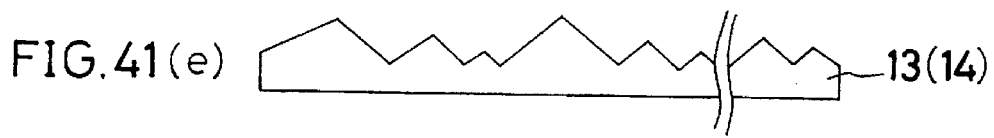
Figure 41F:
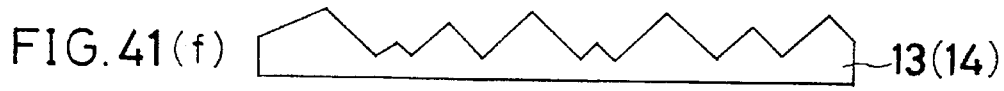

Seventeenth Embodiment:

In this embodiment, as shown in the sectional views of FIGS. 41(a) to 41(f), the distance between a pair of adjacent prisms in the prism arrays 13 and 14 locally varies. In other words, the prism arrays 13 and 14 used in this embodiment have no period pitch. In FIG. 41(a), the distance between a pair of adjacent prisms gradually decreases. In FIG. 41(b), the distance between a pair of adjacent prisms is relatively short at the peripheral portions, but it is relatively long at the central portion. In FIG. 41(c), the distance between a pair of adjacent prisms is relatively long at the peripheral portions, but it is relatively short at the central portion. In FIG. 41(d), the distance between a pair of adjacent prisms alternately becomes long and short. In FIG. 41(e), the prism arrays 13 and 14 each comprise repeating units which are cyclically arranged, each repeating unit including several prisms which are arrayed in such a manner that the distance between a pair of adjacent prisms gradually decreases. In FIG. 41(f), prisms are arrayed at random, without any regularity in terms of the distance between a pair of adjacent prisms. All of these arrangements are capable of suppressing diffraction which is caused by the prism pitch.

Figure 42:
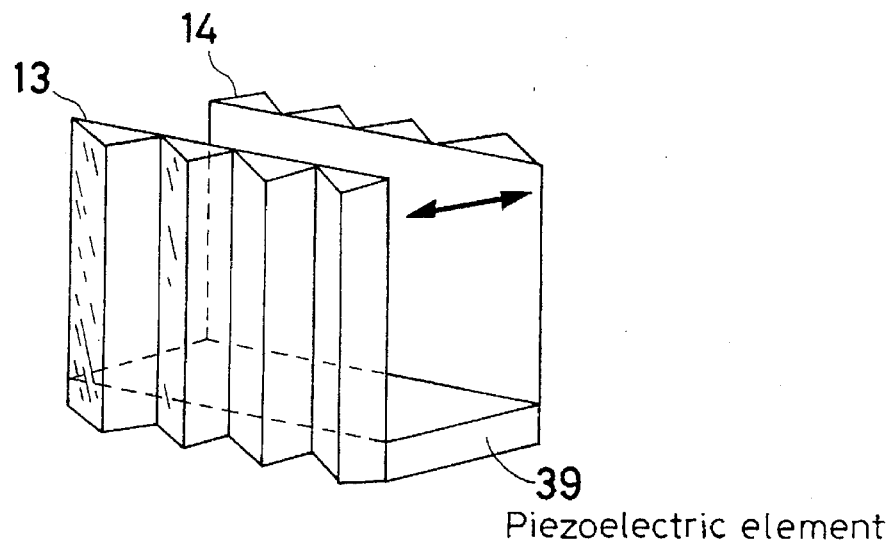
FIG. 42 is a perspective view showing an arrangement for changing the distance between prism arrays in an eighteenth embodiment of the present invention.
Figure 43A:
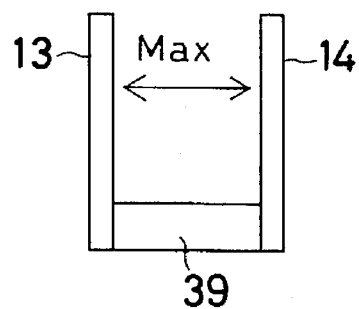
FIGS. 43(a) and 43(b) show the prism arrays in the eighteenth embodiment which are in two different operative states in which the distance between the prism arrays is maximum and minimum, respectively.
Figure 43B:
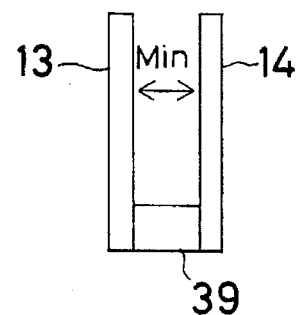
Figure 44A:
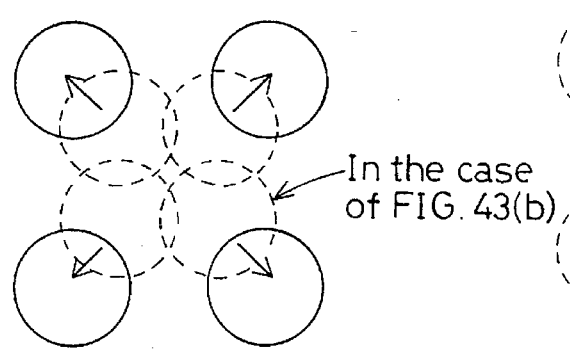
FIGS. 44(a) and 44(b) show the way in which exit pupils move in correspondence to the operative states of the prism arrays shown in FIGS. 43(a) and 43(b).
Figure 44B:
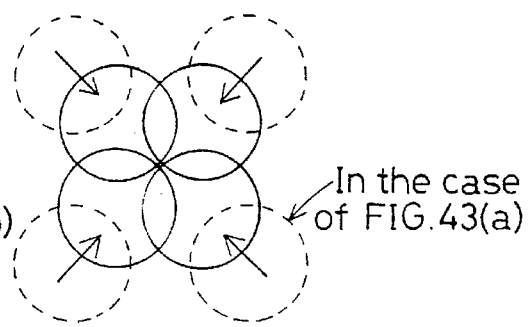
Figure 45:
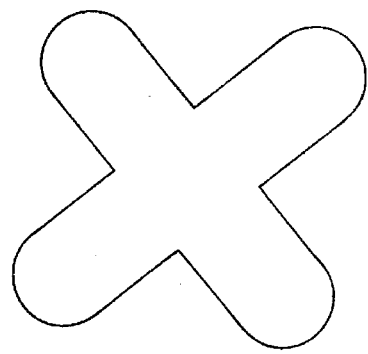
FIG. 45 shows an effective exit pupil formed in the eighteenth embodiment.

Eighteenth Embodiment:

In this embodiment, as shown in FIG. 42, the distance between the prism arrays 13 and 14 is periodically changed, thereby practically changing the distance between each pair of adjacent separated exit pupils, and thus increasing the pupil enlarging ratio. When the distance between the prism arrays 13 and 14 is increased to a maximum value (see FIG. 43(a)), the separated exit pupils come away from each other diagonally (see FIG. 44(a)). When the distance between the prism arrays 13 and 14 is reduced to a minimum value (see FIG. 43(b)), the exit pupils come close to each other (see FIG. 44(b)). If these two states are alternately and periodically formed at such a speed that the change of the distance between the prism arrays 13 and 14 is not visually recognizable, the observer's eye practically sees an exit pupil such as that shown in FIG. 45. In other words, the diameter of each separated exit pupil can be reduced to obtain an exit pupil of the same area as that of the exit pupil that is formed by another pupil diameter-enlarging method. That is, the diameter of the exit pupil before it is enlarged by the prism arrays 13 and 14 can be reduced, and this is advantageous to the ocular optical system in terms of aberration and compactness.

As a method of changing the distance between the two prism arrays 13 and 14, an actuator, for example, a piezoelectric element 39, in which the length changes with the applied voltage, is used between the prism arrays 13 and 14, as shown in FIG. 42.

Nineteenth Embodiment:

In this embodiment, separated exit pupils are arranged differently from the arrangement of the first embodiment, which is shown in FIG. 8, in a case where prisms are two-dimensionally arrayed. As has been mentioned in the eighteenth embodiment, reduction of the exit pupil diameter of the ocular optical system is greatly advantageous to the ocular optical system because the size of the ocular optical system itself can be reduced. However, if the exit pupil diameter is reduced, and the distance between the separated pupils is lengthened, as shown in FIG. 46(a), a problem arises. That is, if the eyeball 4 lies out of the eye point, as shown in FIG. 46(b), a phenomenon is likely to occur in which not the central portion of the image but only the outer peripheral portion of the image can be seen. This phenomenon occurs because the distances from the center to the separated exit pupils are equal to each other (see FIG. 46(a): a=b=c=d). If the separated exit pupils are arranged so that a distance between horizontally opposing exit pupils is longer than the distance between vertically opposing exit pupils ($\alpha>\beta$), as shown in FIG. 47(a), the outer peripheral portion of the image is bright, while the central portion of the image is eclipsed, in the horizontal direction, as will be clear from FIG. 47(b) which shows the way in which a bundle of light rays enters the eyeball 4 which lies out of the eye point in the horizontal direction. However, since the distance between the vertically opposing exit pupils is relatively short, the central portion of the image is bright, while the outer peripheral portion of the image is eclipsed, in the vertical direction, as will be clear from FIG. 47(c) which shows the way in which a bundle of light rays enters the eyeball 4 which lies out of the eye point in the vertical direction. Since it is human nature to gaze at only the center of the displayed image at almost all times during the observation of the image, it is important for the central light rays to enter the observer's pupil 7.

As shown in FIGS. 48(a) and 48(b), when the pupil enlarging ratio is the same, that is, when the area of a rectangle which is defined by connecting the centers of the exit pupils shown in FIG. 48(a) is the same as the area of a rhombus which is defined by connecting the centers of the exit pupils shown in FIG. 48(b), a bundle of light rays is less likely to be eclipsed in the pupil arrangement as shown in FIG. 48(b). Thus, in this embodiment, the exit pupils are arranged so as to compensate for ray bundles which are likely to be eclipsed in the vertical and horizontal directions. Accordingly, conditions under which ray bundles can enter the pupil 7 are broadened. Therefore, when the pupil enlarging ratio is the same, the exit pupil diameter of the ocular optical system can be further reduced, and it is possible to cope even more widely with the displacement of the eye 4 relative to the eye point.

Figure 49:
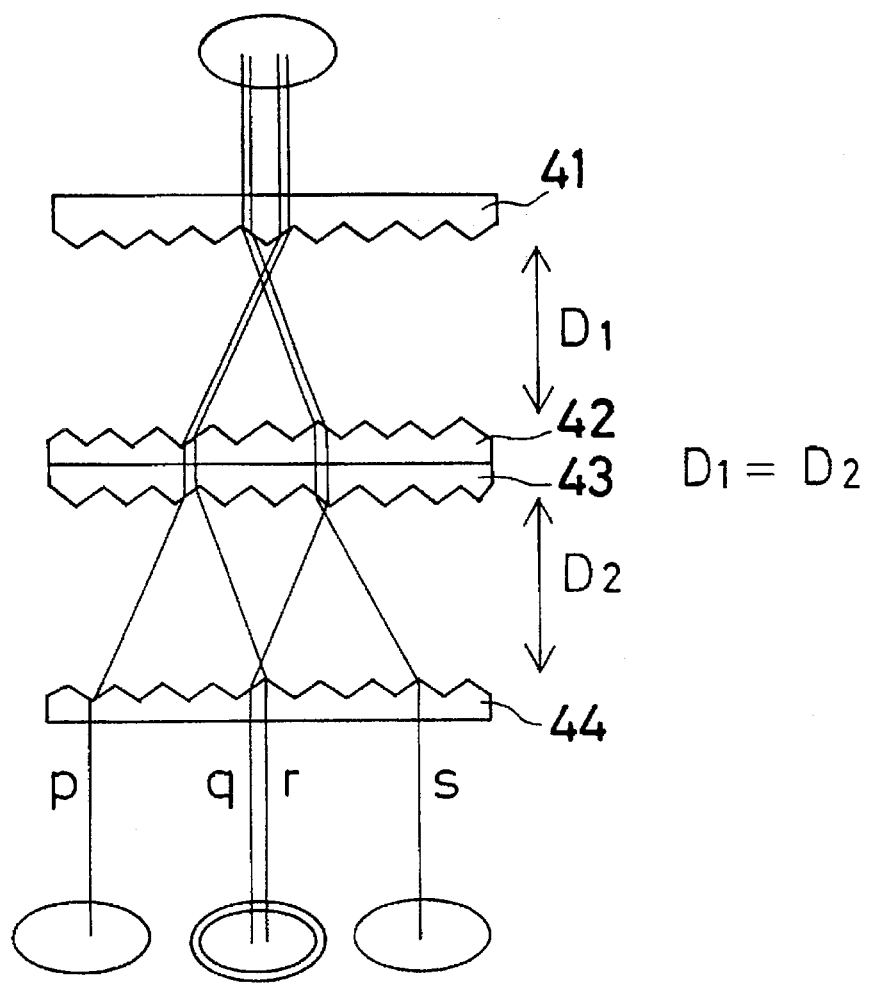
FIG. 49 shows the way in which the pupil diameter is enlarged when four prism arrays are disposed in a twentieth embodiment of the present invention.
Figure 50:
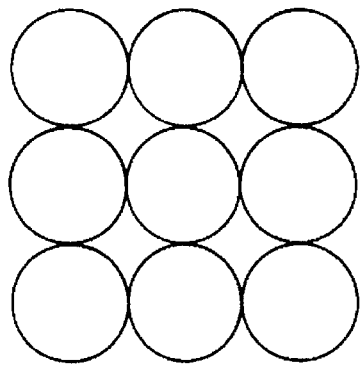
FIG. 50 shows the arrangement of separated exit pupils when two-dimensionally arrayed prisms are used in the twentieth embodiment.

Twentieth Embodiment:

In this embodiment, as shown in FIG. 49, an exit pupil is separated into three to enlarge the exit pupil diameter by using four prism arrays 41 to 44 each comprising one-dimensionally arrayed prisms. The four prism arrays 41 to 44 are disposed such that the second prism array 42 and the third prism array 43 are placed in contact with each other, and the distance D1 between the first and second prism arrays 41 and 42 and the distance D2 between the third and fourth prism arrays 43 and 44 are equal to each other (D1=D2). Consequently, separated light rays q and r coincide with each other in the center, and thus the exit pupil is separated into three. In the case of two-dimensionally arrayed prisms, the exit pupil is also separated into three in another direction. That is, the light rays p, q(=r) and s, shown in FIG. 49, are each separated into three also in the vertical direction. Therefore, it is possible to form a total of nine exit pupils as shown in FIG. 50.

Figure 51:
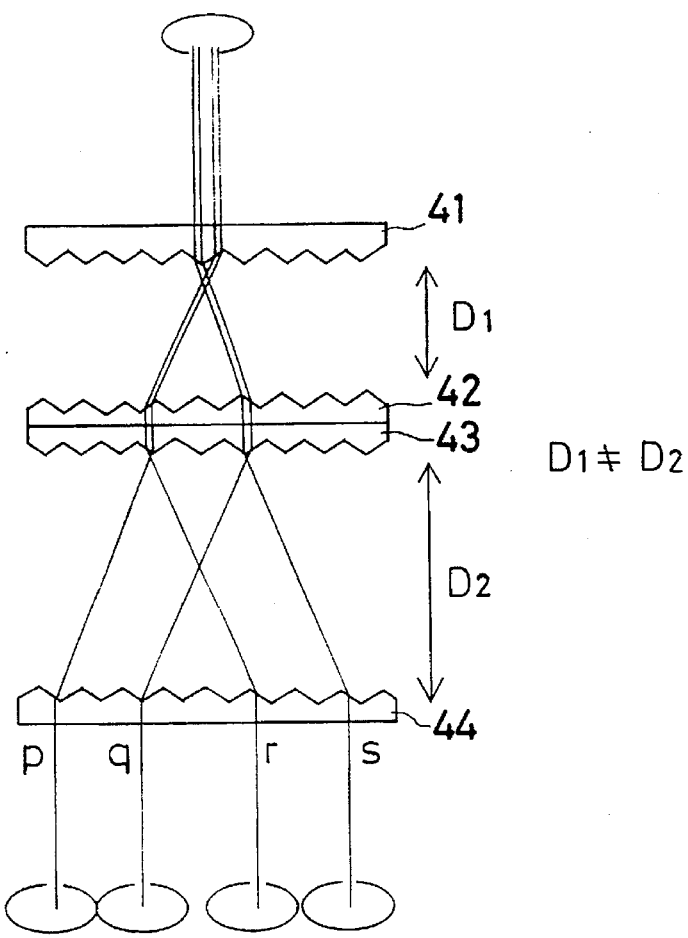
FIG. 51 shows the way in which the pupil diameter is enlarged when four prism arrays are disposed in a twenty-first embodiment of the present invention.
Figure 52:
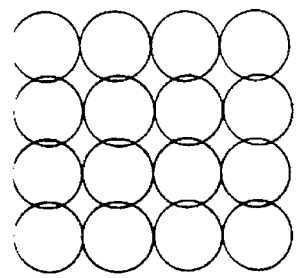
FIG. 52 shows the arrangement of separated exit pupils when two-dimensionally arrayed prisms are used in the twenty-first embodiment.

Twenty-first Embodiment:

In this embodiment, as shown in FIG. 51, an exit pupil is separated into four to enlarge the exit pupil diameter by using four prism arrays 41 to 44 each comprising one-dimensionally arrayed prisms. The prism arrays 41 to 44 are disposed such that the second and third prism arrays 42 and 43 are placed in contact with each other, and the distance D1 between the first and second prism arrays 41 and 42 and the distance D2 between the third and fourth prism arrays 43 and 44 are different from each other (D1≠D2). Consequently, the exit pupil is separated into four. In the case of two-dimensionally arrayed prisms, the exit pupil is also separated into four in another direction. That is, the light rays p, q, r and s, shown in FIG. 51, are each separated into four also in the vertical direction. Therefore, it is possible to form a total of 16 exit pupils as shown in FIG. 52.

Figure 53:
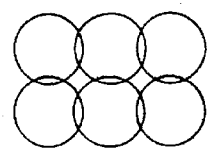
FIG. 53 shows the arrangement of separated exit pupils when two-dimensionally arrayed prisms are used in a twenty-second embodiment of the present invention.
Figure 54A:
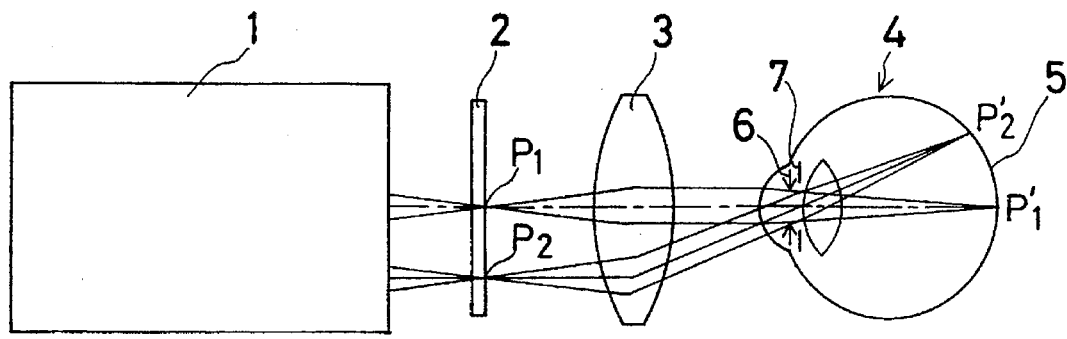
FIGS. 54(a) and 54(b) illustrate a problem arising when the numerical aperture of an ocular lens is small.
Figure 54B:
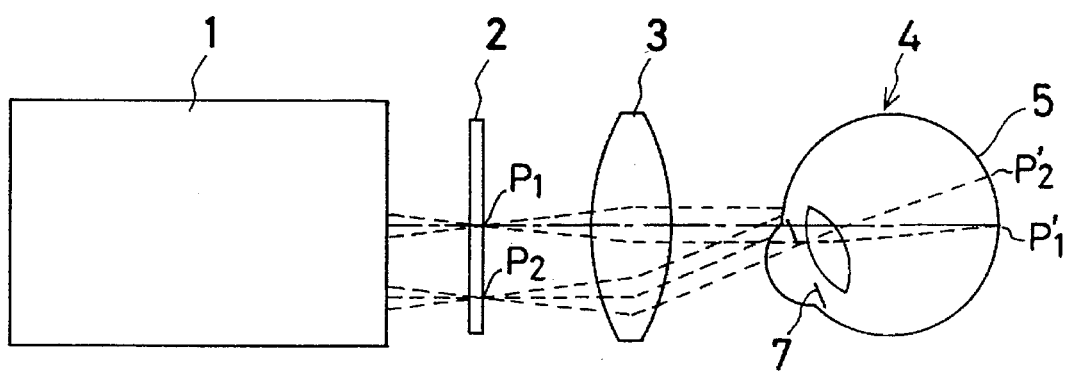
Figure 55:
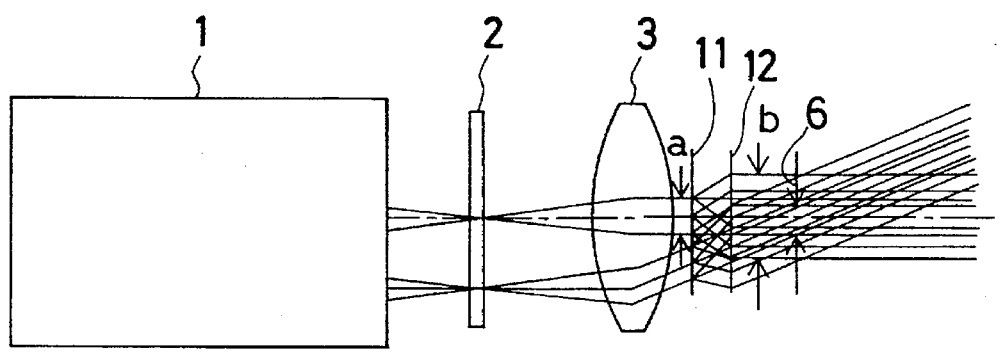
FIG. 55 shows an essential part of a head-mounted image display apparatus according to a prior application.

Twenty-second Embodiment:

In this embodiment, an exit pupil is separated into three in the horizontal direction by using the arrangement as shown in FIG. 49, and also separated into two in the vertical direction by using two prism arrays (for example, only the prism arrays 41 and 42 have two-dimensionally arrayed prisms), thereby forming a total of six exit pupils two-dimensionally, as shown in FIG. 53.

Although the image display apparatus of the present invention has been described by way of some embodiments, it should be noted that the present invention is not necessarily limited to the described embodiment, and that various changes and modifications may be imparted thereto.

As will be clear from the foregoing description, the image display apparatus of the present invention has a first prism array which is provided between the image display device and the exit pupil to separate a bundle of light rays emanating from the image display device, and a second prism array which directs at least a part of the ray bundle separated by the first prism array to travel in the same direction. Accordingly, at least a part of the ray bundle separated by the first prism array is directed by the second prism array to travel in the same direction. Consequently, the diameter of the ray bundle enlarges, and thus the exit pupil diameter enlarges. Accordingly, it is possible to obtain an image display apparatus which uses a compact optical system and yet has minimal aberrations.

What we claim is:

1. An image display apparatus comprising:

an image display device for displaying an image;

an ocular optical system for forming an exit pupil by using a bundle of light rays emanating from said image display device;

a first prism array; and a second prism array;

said first prism array and said second prism array being provided between said image display device and said exit pupil;

said first prism array having a plurality of approximately parallel grooves and a plurality of crests formed between said plurality of grooves and approximately in parallel to said plurality of grooves, whereby said bundle of light rays emanating from said image display device is separated by a refracting action of a surface formed by said plurality of crests and said plurality of grooves; and said second prism array having a plurality of crests and a plurality of grooves extending in a same direction as said plurality of crests and said plurality of grooves of said first prism array, whereby said ray bundle separated by said first prism array is separated by a surface formed by said plurality of crests and said plurality of grooves of said second prism array to form a plurality of exit pupils.

2. An image display apparatus comprising:

an image display device for displaying an image;

an ocular optical system for forming an exit pupil by using a bundle of light rays emanating from said image display device;

support means for retaining said image display device and said ocular optical system on an observer's head;

a first prism array; and a second prism array;

said first prism array and said second prism array being provided between said image display device and said exit pupil;

said first prism having a plurality of approximately parallel grooves and a plurality of crests formed between said plurality of grooves and approximately in parallel to said plurality of grooves, whereby said bundle of light rays emanating from said image display device is separated by a refracting action of a surface formed by said plurality of crests and said plurality of grooves; and said second prism array having a plurality of crests and a plurality of grooves extending in a same direction as said plurality of crests and said plurality of grooves of said first prism array, whereby said ray bundle separated by said first prism array is separated by a surface formed by said plurality of crests and said plurality of grooves of said second prism array to form a plurality of exit pupils.

3. An image display apparatus according to claim 1 or 2, wherein said first prism array and said second prism array each comprise:

a plurality of quadrangular pyramids which are regularly arranged in a two-dimensional array on a surface of a transparent substrate.

4. An image display apparatus according to claim 1 or 2, wherein:

said first prism array and said second prism array are each formed of a superimposed plurality of one-dimensional prism array surfaces which are different in period direction from each other.

5. An image display apparatus according to claim 1 or 2, wherein:

a first period pitch of said first prism array is different from a second period pitch of said second prism array.

6. An image display apparatus according to claim 5, which satisfies one of the following relationships:

$(n+\frac{1}{2}-\frac{1}{4})p_2 < p_1 < (n+\frac{1}{2}+\frac{1}{4})p_2$ and $(n+\frac{1}{2}-\frac{1}{4})p_1 < p_2 < (n+\frac{1}{2}+\frac{1}{4})p_1$ wherein (n is an integer).

7. An image display apparatus according to claim 5, which satisfies the following relationship:

$|p_1 \cdot p_2/(p_1-p_2)| \leq 3$ (mm).

8. An image display apparatus according to claim 1, wherein:

respective vertex angles of a plurality of prisms constituting said first prism array are approximately the same as respective vertex angles of a plurality of prisms constituting said second prism array, said respective vertex angles being within a range of from 120° to 160°.

9. An image display apparatus according to claim 1, wherein said first prism array and said second prism array each comprise:

an optical member used as a medium having a refractive index which is larger than 1;

a serrated prism surface provided on one side thereof; and a planar back surface provided on a side thereof which faces said prism surface across said medium;

said first prism array and said second prism array being disposed such that said respective prism surfaces thereof face each other.

10. An image display apparatus according to claim 1, wherein said first prism array and said second prism array each comprise:

a serrated prism surface provided on one side thereof; and a planar back surface provided on a side thereof which faces said prism surface;

said first prism array and said second prism array being disposed so that respective back surfaces thereof face each other.

11. An image display apparatus according to claim 1 or 2, further comprising:

a light-blocking member having light-blocking and light-transmitting portions which are alternately provided, said light-blocking member being disposed between said image display device and said exit pupil to block a part of light.

12. An image display apparatus according to claim 10, wherein:

said first prism array and said second prism array are bonded or integrated together at respective back surfaces thereof.

13. An image display apparatus according to claim 1, further comprising:

a diopter correcting lens;

wherein said first prism array, said second prism array, and said diopter correcting lens are successively disposed on an optical path.

14. An image display apparatus according to claim 13, wherein:

a combination of said image display device, said ocular optical system, said first prism array, said second prism array, and said diopter correcting lens is disposed for each of left and right eyes and said respective ocular optical systems for the left and right eyes are disposed so that optical axes of said ocular optical systems intersect each other approximately at a position which is at a distance equivalent to a diopter of said diopter correcting lens.

15. An image display apparatus according to claim 13 or 14, wherein:

said diopter correcting lens has a mechanism for adjusting a diopter.

16. An image display apparatus according to claim 1, wherein:

said plurality of exit pupils have a polygonal shape.

17. An image display apparatus according to claim 16, wherein:

said polygonal shape is a square shape.

18. An image display apparatus according to claim 1, wherein:

a first distance between a pair of adjacent prisms constituting each of said first prism array and said second prism array is different from a second distance between another pair of adjacent prisms.

19. An image display apparatus according to claim 1, wherein:

at least one of said first prism array and said second prism array is vibrated to periodically change a distance between said first prism array and said second prism array.

20. An image display apparatus according to claim 1, further comprising:

another first prism array, said another first prism array being disposed such that a plurality of crests and a plurality of grooves thereof extend in a direction perpendicularly intersecting said plurality of crests and said plurality of grooves of said first prism array; and another second prism array, said another second prism array being disposed such that a plurality of crests and a plurality of grooves thereof extend in a direction perpendicularly intersecting said plurality of crests and said plurality of grooves of said second prism array;

whereby a plurality of exit pupils are formed separately in horizontal and vertical directions of the image by said first prism array and said another first prism array, and said second prism array and said another second prism array.

21. An image display apparatus according to claim 1, further comprising:

a third prism array; and a fourth prism array;

said third prism array and said fourth prism array being provided between said image display device and said exit pupil.

22. An image display apparatus according to claim 21, wherein:

a distance between said first prism array and said second prism array is equal to a distance between said third prism array and said fourth prism array.

* * * * *